United States Patent
Liu et al.

(10) Patent No.: US 11,128,860 B2
(45) Date of Patent: Sep. 21, 2021

(54) AFFINE MODE CALCULATIONS FOR DIFFERENT VIDEO BLOCK SIZES

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/117,558

(22) Filed: Dec. 10, 2020

(65) Prior Publication Data
US 2021/0092366 A1   Mar. 25, 2021

Related U.S. Application Data

(63) Continuation of application No. PCT/IB2019/057568, filed on Sep. 9, 2019.

(30) Foreign Application Priority Data
Sep. 8, 2018 (WO) ................ PCT/CN2018/104723

(51) Int. Cl.
*H04N 19/137* (2014.01)
*H04N 19/176* (2014.01)
(Continued)

(52) U.S. Cl.
CPC ......... *H04N 19/105* (2014.11); *H04N 19/132* (2014.11); *H04N 19/137* (2014.11);
(Continued)

(58) Field of Classification Search
CPC ................................................... H04N 19/105
See application file for complete search history.

(56) References Cited

U.S. PATENT DOCUMENTS

| 10,582,212 B2* | 3/2020 | Mukherjee | H04N 19/54 |
| 10,701,392 B2* | 6/2020 | Hsu | H04N 19/593 |

(Continued)

FOREIGN PATENT DOCUMENTS

| EP | 1469682 A1 | 10/2004 |
| EP | 3203743 A1 | 8/2017 |

(Continued)

OTHER PUBLICATIONS

Akula et al. "Description of SDR, HDR and 360 degree Video Coding Technology Proposal Considering Mobile Application Scenario by Samsung, Huawei, GoPro, and HiSilicon," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.

(Continued)

*Primary Examiner* — Irfan Habib
(74) *Attorney, Agent, or Firm* — Perkins Coie LLP

(57) ABSTRACT

Video coding and decoding in which the bitstream is generated using affine motion compensation mode are described. One example includes generating, for a reconstruction of a current video unit, a list of affine motion vector prediction candidates in which each candidate in the list is calculated without using a clipping operation, wherein the clipping operation limits a magnitude of the candidate motion vectors to a limit; and performing the reconstruction of the current video unit using the list of affine motion vector prediction candidates.

18 Claims, 36 Drawing Sheets

(51) Int. Cl.
　　　H04N 19/105　　(2014.01)
　　　H04N 19/30　　(2014.01)
　　　H04N 19/132　　(2014.01)
　　　H04N 19/139　　(2014.01)
　　　H04N 19/513　　(2014.01)
　　　H04N 19/186　　(2014.01)
(52) U.S. Cl.
　　　CPC .......... *H04N 19/139* (2014.11); *H04N 19/30* (2014.11); *H04N 19/513* (2014.11); *H04N 19/176* (2014.11); *H04N 19/186* (2014.11)

(56) References Cited

U.S. PATENT DOCUMENTS

| | | | | |
|---|---|---|---|---|
| 10,805,608 | B2 * | 10/2020 | Lee | H04N 19/159 |
| 10,827,198 | B2 * | 11/2020 | Zhang | H04N 19/52 |
| 10,841,794 | B2 * | 11/2020 | Liu | H04N 19/70 |
| 2018/0098063 | A1 * | 4/2018 | Chen | H04N 19/537 |
| 2018/0098089 | A1 * | 4/2018 | Chen | H04N 19/521 |
| 2019/0082191 | A1 * | 3/2019 | Chuang | H04N 19/176 |
| 2019/0222865 | A1 * | 7/2019 | Zhang | H04N 19/139 |
| 2020/0077113 | A1 * | 3/2020 | Huang | H04N 19/46 |
| 2020/0112725 | A1 * | 4/2020 | Huang | H04N 19/122 |
| 2020/0221120 | A1 * | 7/2020 | Robert | H04N 19/521 |
| 2020/0228821 | A1 * | 7/2020 | Chuang | H04N 19/513 |
| 2020/0374528 | A1 * | 11/2020 | Huang | H04N 19/159 |

FOREIGN PATENT DOCUMENTS

| | | |
|---|---|---|
| EP | 3566442 A1 | 11/2019 |
| WO | 2017157259 A1 | 9/2017 |
| WO | 2018064948 A1 | 4/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Description of SDR, HDR and 360 degree Video Coding Technology Proposal by Qualcomm and Technicolor—Low and High Complexity Version," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0337, 2018.

He et al. "CE4-Related: Adaptive Precision for Affine MVD Coding," Joint Video Experts Team (JVET) of ITU-T SG 16 WP 3 and ISO/IEC JT 1/SC 29/WG 11 12th Meeting, Macao, CN, Oct. 3-12, 2018, document JVET-L0259, 2018.

Huang et al. "Control-Point Representation and Differential Coding Affine-Motion Compensation," IEEE Transactions on Circuits and Systems for Video Technology, Oct. 2013, 23(10):1681-1660.

ITU-T H.265 "High efficiency video coding" Series H: Audiovisual and Multimedia Systems Infrastructure of audiovisual services—Coding of moving video,Telecommunication Standardization Sector of ITU, (Feb. 2018).

JEM-7.0: https://jvet.hhi.fraunhofer.de/svn/svn_HMJEMSoftware/tags/ HM-16.6-JEM-7.0.(only website).

Li et al. "An Efficient Four-Parameter Affine Motion Model for Video Coding," IEEE Transactions on Circuits and Systems for Video Technology, Aug. 2018, 28(8):1934-1948.

Li et al. "AHG5: Reduction of Worst Case Memory Bandwidth," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0122, 2018.

Li et al. "CE2: Memory Bandwidth Reduction for Affine Mode (Test 2.4.2)," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0309, 2019.

Liu et al. "CE4-Related: Adaptive Motion Vector Resolution for Affine Inter Mode," Joint Video Experts Team (JVET0 of ITU-T SG 16 WP 3 and ISO/IEC JTC 1/SC 29/WG 11 12th Meeting, Macao, CN, Oct. 3-12, 2018, document JVET-L0332, 2018.

Reeves: "Rounding," Oct. 17, 2012, retrieved from the internet URL: http://web.cse.ohio-state.edu/reeves.92/CSE2421au12/SlidesDay31.pdf, retrieved on Dec. 19, 2019.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

International Search Report and Written Opinion from International Patent Application No. PCT/IB2019/057567 dated Jan. 8, 2020 (16 pages).

International Search Report and Written Opinion from International Patent Application No. PCT/IB2019/057568 dated Mar. 4, 2020 (21 pages).

International Search Report and Written Opinion from International Patent Application No. PCT/IB2019/057569 dated Jan. 29, 2020 (18 pages).

* cited by examiner

AFFINE MODE CALCULATIONS FOR DIFFERENT VIDEO BLOCK SIZES

CROSS REFERENCE TO RELATED APPLICATIONS

This application is a continuation of International Application No. PCT/IB2019/057568, filed on Sep. 9, 2019, which claims the priority to and benefits of International Patent Application No. PCT/CN2018/104723, filed on Sep. 8, 2018. All the aforementioned patent applications are hereby incorporated by reference in their entireties.

TECHNICAL FIELD

This patent document relates to video coding techniques, decoding techniques, devices, and systems.

BACKGROUND

Motion compensation (MC) is a technique in video processing to predict a frame in a video, given the previous and/or future frames by accounting for motion of the camera and/or objects in the video. Motion compensation can be used in the encoding of video data for video compression.

SUMMARY

This document discloses methods, systems, and devices related to the use of affine motion compensation in video coding and decoding. In one representative aspect, a video processing method is disclosed. The method includes generating, for a reconstruction of a current video unit, a list of affine motion vector prediction candidates in which each candidate in the list is calculated without using a clipping operation, wherein the clipping operation limits a magnitude of the candidate motion vectors to a limit; and performing the reconstruction of the current video unit using the list of affine motion vector prediction candidates.

In yet another aspect, another video processing method is disclosed. The method includes constructing, during generation of a video unit from a coded representation thereof, a list of affine motion vector predictors using a precision that is same as a precision used for encoding motion vector differences in an affine video coding mode in the coded representation and performing the generation of the video unit using the list of affine motion vector prediction candidates.

In yet another aspect, another video processing method is disclosed. The method includes determining, for a conversion between a coded representation of a video block and the video block that is affine coded, that usage of multiple motion vector differences (MVDs) with different precisions is enabled for the conversion; and performing the conversion based on the determining.

In yet another aspect, a video processing method is disclosed. The method includes applying a motion-based subblock coding tool to a current video unit, wherein the tool is at least based on deriving a first motion information for motion compensation at a first block size and a second motion information at a second block size different from the first block size; and storing the second motion information for motion prediction of a future video unit.

In yet another aspect, a video processing method is disclosed. The method includes reconstructing a video unit using a coded representation thereof, wherein the coded representation includes rounding a motion vector difference information for the video unit using:

$$\left(\left(\sum_{i=0}^{n-1} dMV_c^i[1] * w + o(w)\right) \gg k(w),\right.$$
$$\left.\left(-\sum_{i=0}^{n-1} -dMV_c^i[3] * w + o(w)\right) \gg k(w)\right)$$

wherein $dMV^i_c[1]$, $dMV^i_c[3]$ denote horizontal and vertical motion vector difference of a top-right control point used in a 4-parameter affine model derived in an ith iteration, wherein $\gg$ is bit shift operation, w is a width of the video unit, k(w) is a non-negative integer, and o(w) is an offset.

In yet another aspect, a video processing method is disclosed. The method includes using a coded representation of a video unit associated with an affine video coding mode that includes use of multiple motion vector differences (MVDs) coded with different precisions such that a first MVD has a first precision and a second MVD has a second precision different from the first MVD; and constructing the video unit using the coded representation.

In yet another representative aspect, the various techniques described herein may be embodied as a computer program product stored on a non-transitory computer readable media. The computer program product includes program code for carrying out the methods described herein.

In yet another representative aspect, a video encoder apparatus may implement a method as described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

DETAILED DESCRIPTION

Figure 1:
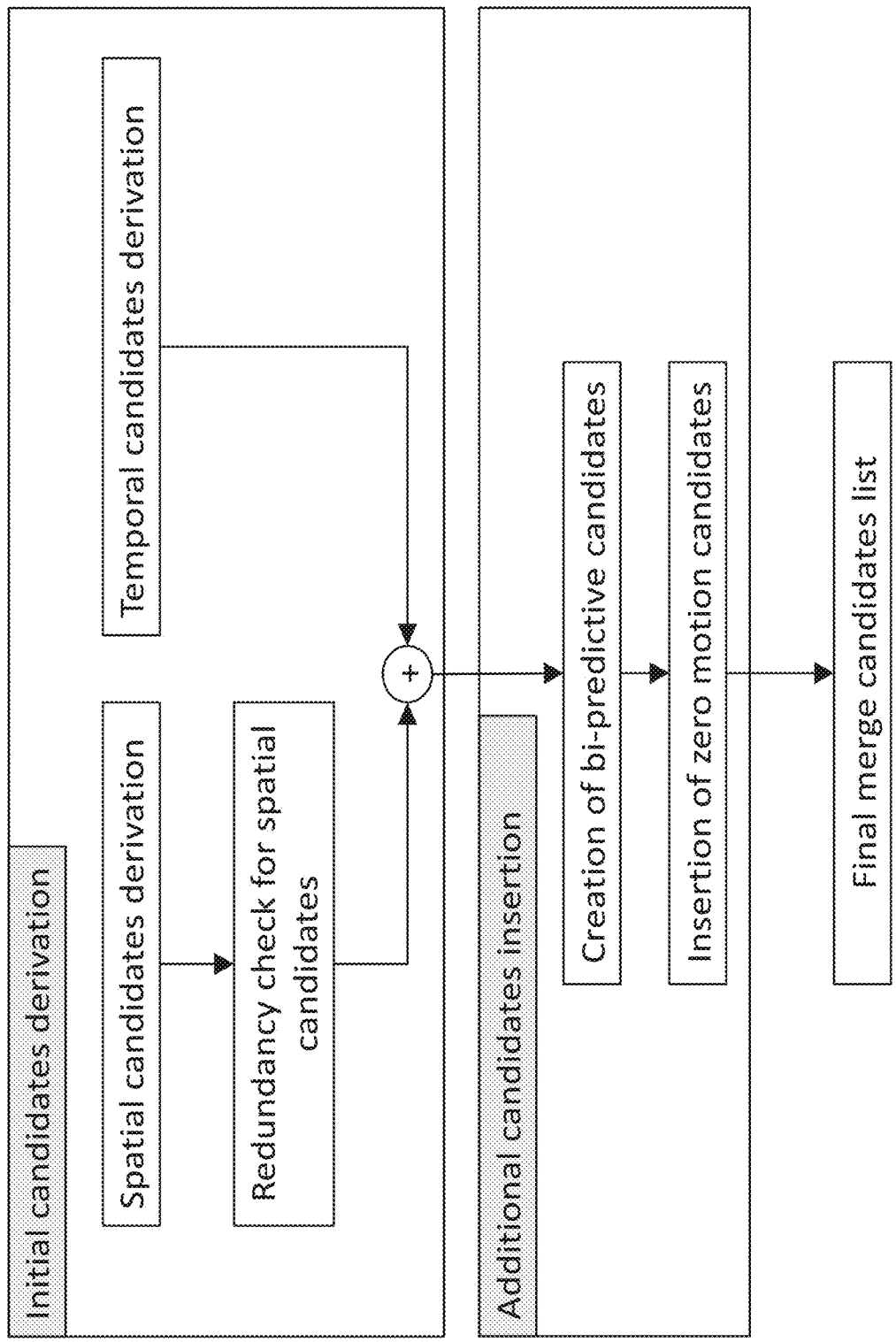
FIG. 1 shows an example of a derivation process for merge candidates list construction.

The present document provides several techniques that can be embodied into digital video encoders and decoders. Section headings are used in the present document for clarity of understanding and do not limit scope of the techniques and embodiments disclosed in each section only to that section.

1. Summary

The disclosed technology is related to video coding technologies. Specifically, it is related to post-reconstruction filters, e.g., bilateral filter in image/video coding. It may be applied to the existing video coding standard like HEVC, or the standard (Versatile Video Coding) to be finalized. It may be also applicable to future video coding standards or video codec.

2. Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Merge Mode 2.1.1.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 shows an example of a derivation process for merge candidates list construction.

2.1.1.2 Spatial Candidates Derivation

Figure 2:
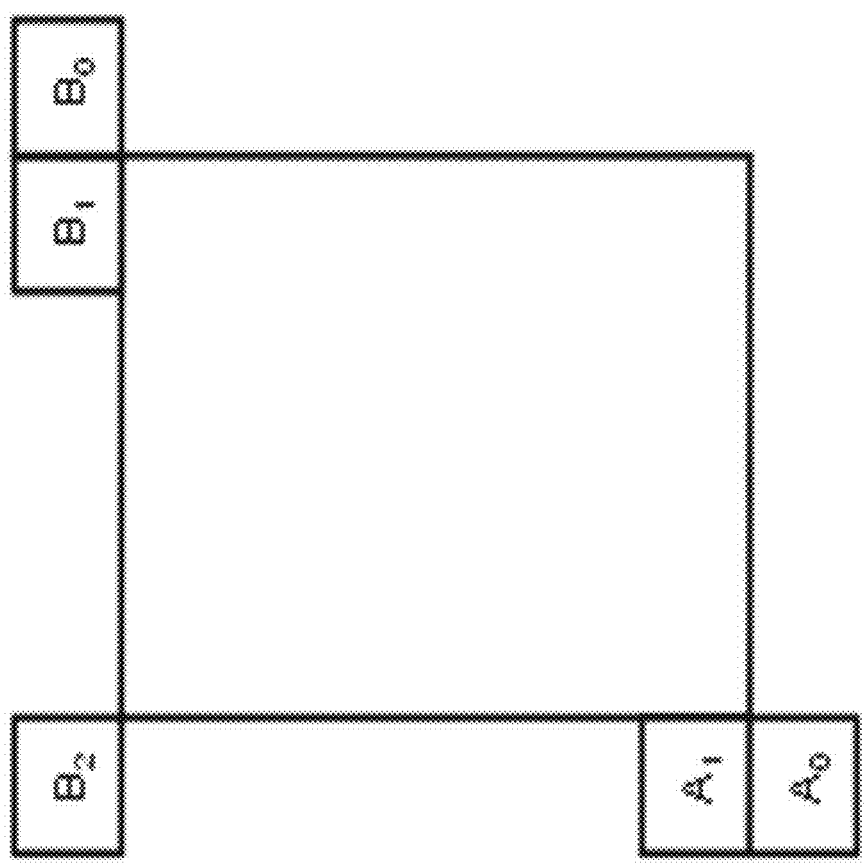
FIG. 2 shows examples of positions of spatial merge candidates.
Figure 3:
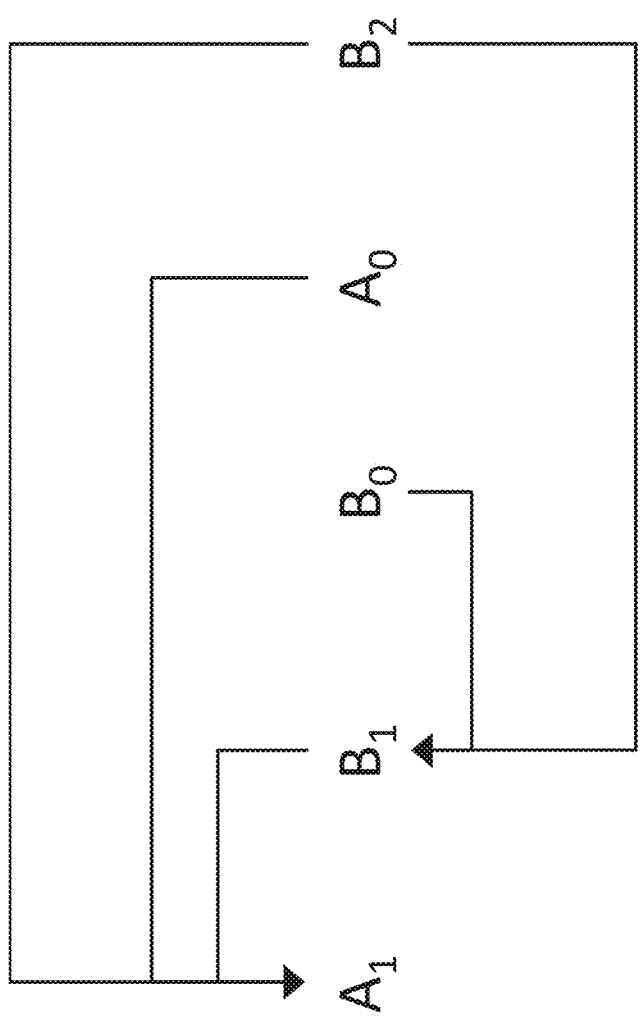
FIG. 3 shows an example of candidate pairs considered for redundancy check of spatial merge candidates.
Figures 4A, 4B:
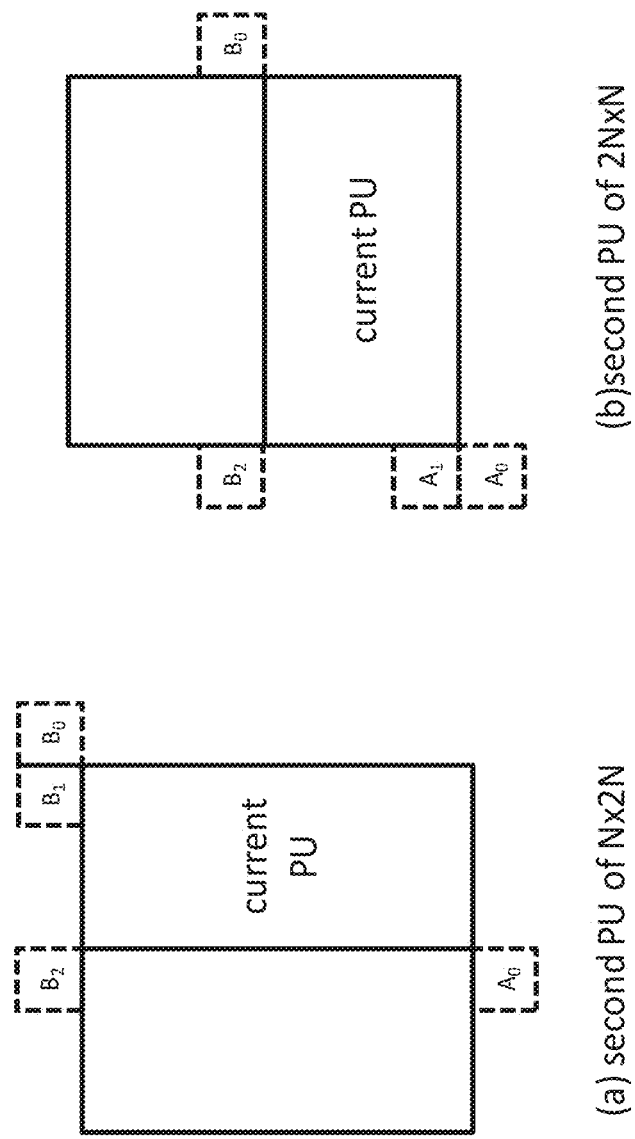
FIGS. 4A and 4B show example positions for the second PU of N×2N and 2N×N partitions.

In the derivation of spatial merge candidates, a maximum of four merge candidates are selected among candidates located in the positions depicted in FIG. 2. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the cases N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 2 shows an example of positions of spatial merge candidates.

FIG. 3 shows examples of candidate pairs considered for redundancy check of spatial merge candidates.

FIGS. 4A and 4B show example positions for the second PU of N×2N and 2N×N partitions.

2.1.1.3 Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
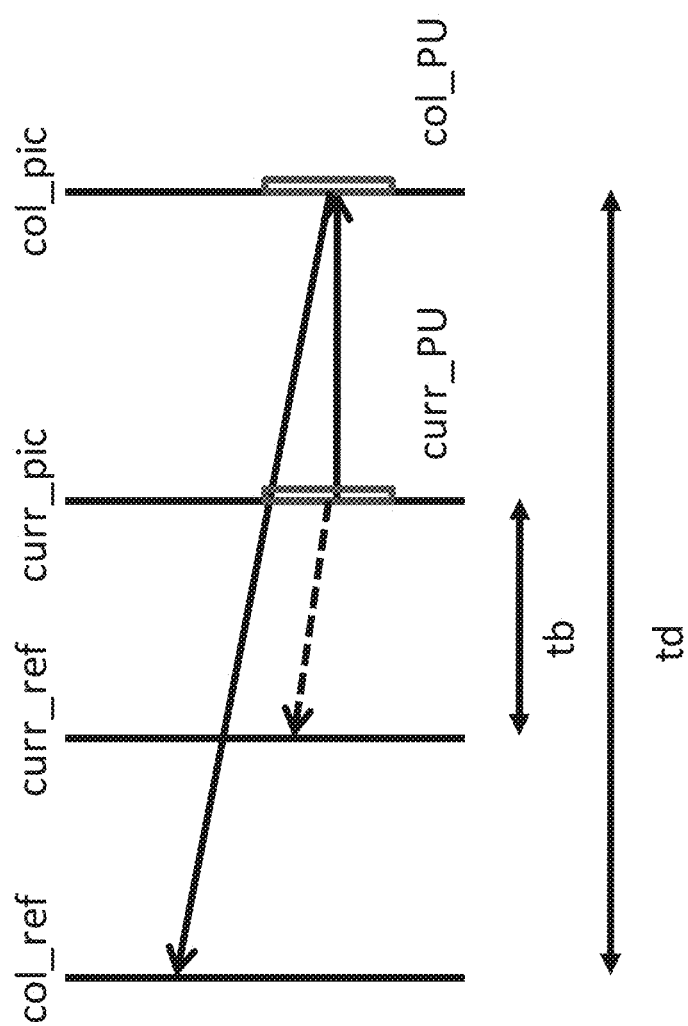
FIG. 5 is an illustration of motion vector scaling for temporal merge candidate.

FIG. 5 is an illustration of motion vector scaling for temporal merge candidate.

Figure 6:
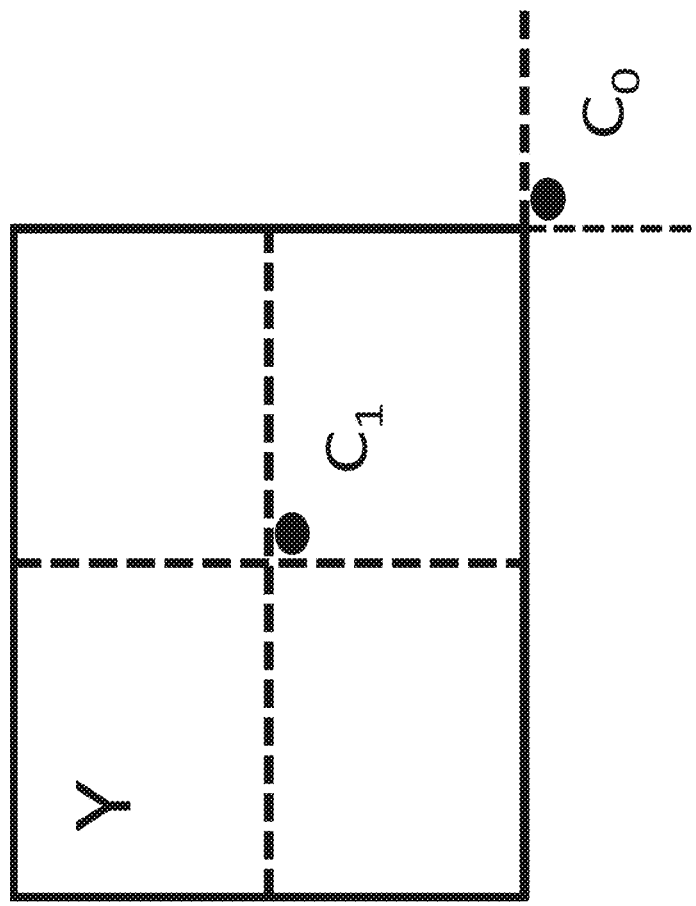
FIG. 6 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

FIG. 6 shows examples of candidate positions for temporal merge candidate, C0 and C1.

2.1.1.4 Additional Candidates Insertion

Figures 7A, 7B:
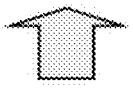
FIGS. 7A and 7B show examples of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIGS. 7A and 7B depict the case when two candidates in the original list (on the left), having mvL0 and refIdxL0 or mvL1 and refIdxL1, are used to create a combined bi-predictive merge candidate added to the final list (on the right). There are numerous rules regarding the combinations which are considered to generate these additional merge candidates.

FIGS. 7A and 7B show examples of combined bi-predictive merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signaled in the picture parameter set using the "log 2_parallel_merge_level_minus2" syntax element. When a MER is defined, merge candidates falling in the same region are marked as unavailable and therefore not considered in the list construction.

2.1.2 AMVP

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

2.1.2.1 Derivation of AMVP Candidates

Figure 8:
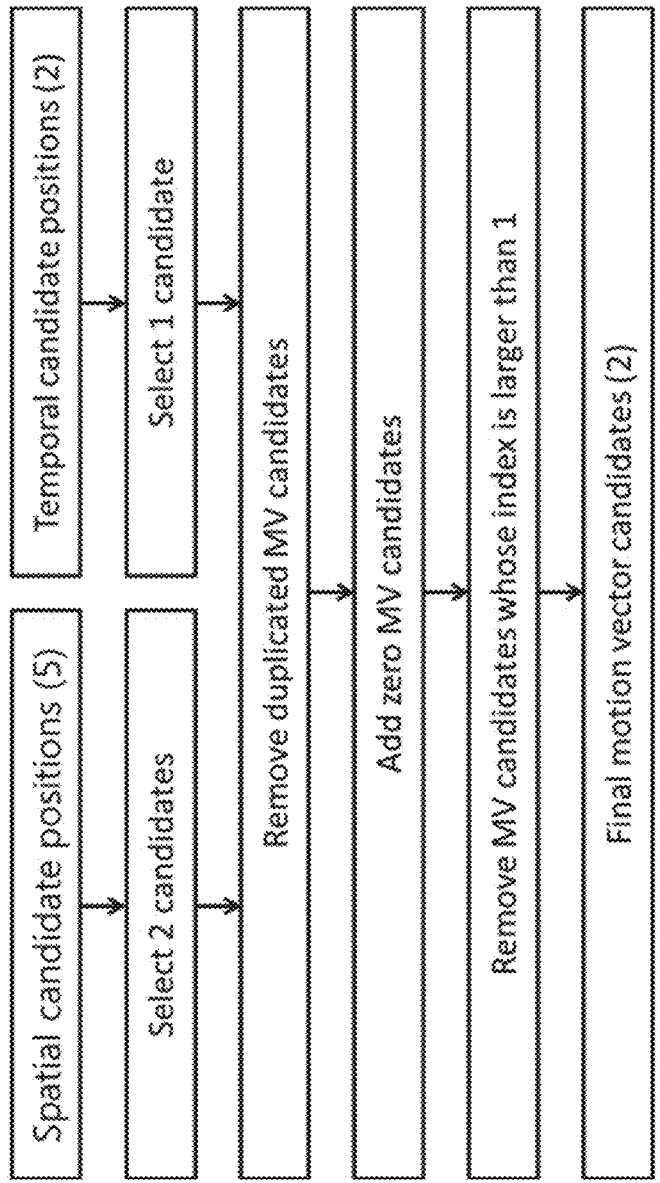
FIG. 8 shows an example of a derivation process for motion vector prediction candidates.

FIG. 8 illustrates an example derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
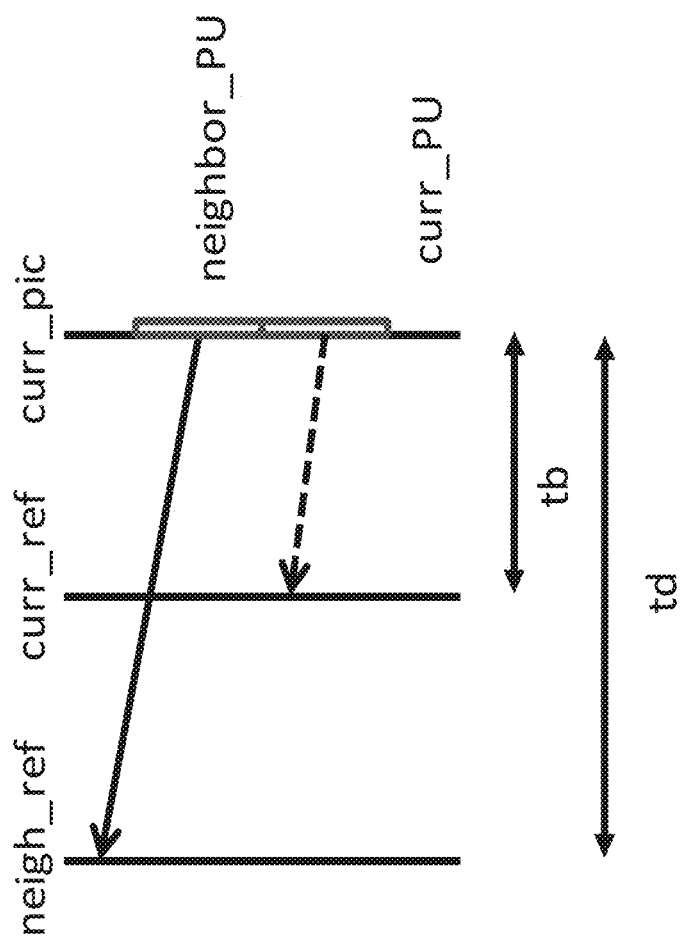
FIG. 9 is an illustration of motion vector scaling for spatial motion vector candidate.

FIG. 9 is an illustration of motion vector scaling for spatial motion vector candidate.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.2.3 Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder.

2.2 New Inter Prediction Methods in JEM

2.2.1 Sub-CU Based Motion Vector Prediction

In the JEM with QTBT (quad tree binary tree), each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 10:
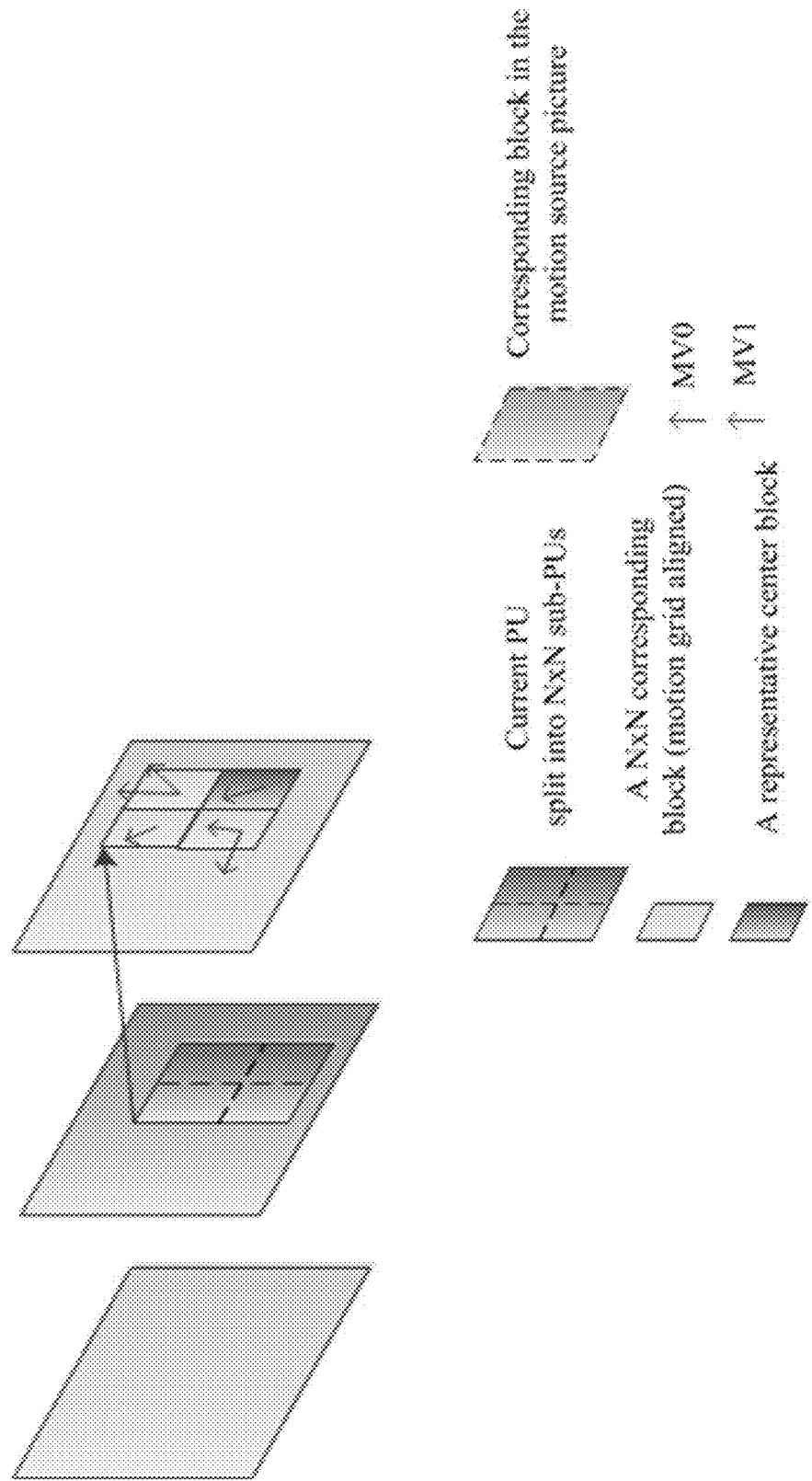
FIG. 10 shows an example of ATMVP (alternative temporal motion vector prediction) motion prediction for a CU (coding unit).

FIG. 10 shows an example of ATMVP motion prediction for a CU

2.2.1.1 Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs, for example, can be square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector MVy (with X being equal to 0 or 1 and Y being equal to 1−X) for each sub-CU.

2.2.1.2 Spatial-Temporal Motion Vector Prediction

Figure 11:
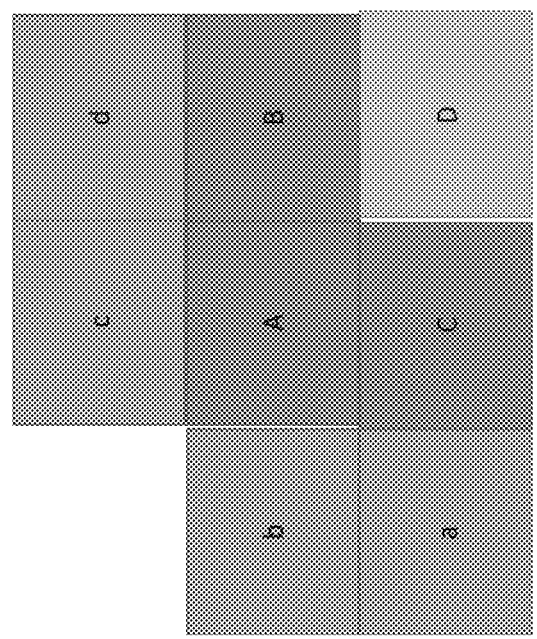
FIG. 11 shows an example of one CU with four sub-blocks (A-D) and its neighboring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 11 shows an example of one CU with four sub-blocks (A-D) and its neighbouring blocks (a-d)

2.2.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC (context adaptive binary arithmetic coding). While in HEVC, only the first bin is context coded and the remaining bins are context by-pass coded.

2.2.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.2.3 Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used, as described in section 2.2.2.

SHVC (scalable high efficiency video coding) upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.2.4 Overlapped Block Motion Compensation

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC, frame rate upconversion, mode), each sub-block of the CU is a MC block. To process CU boundaries in a uniform fashion, OBMC is performed at sub-block level for all MC block boundaries, where sub-block size is set equal to 4×4, as illustrated in FIG. 12.

Figure 12:
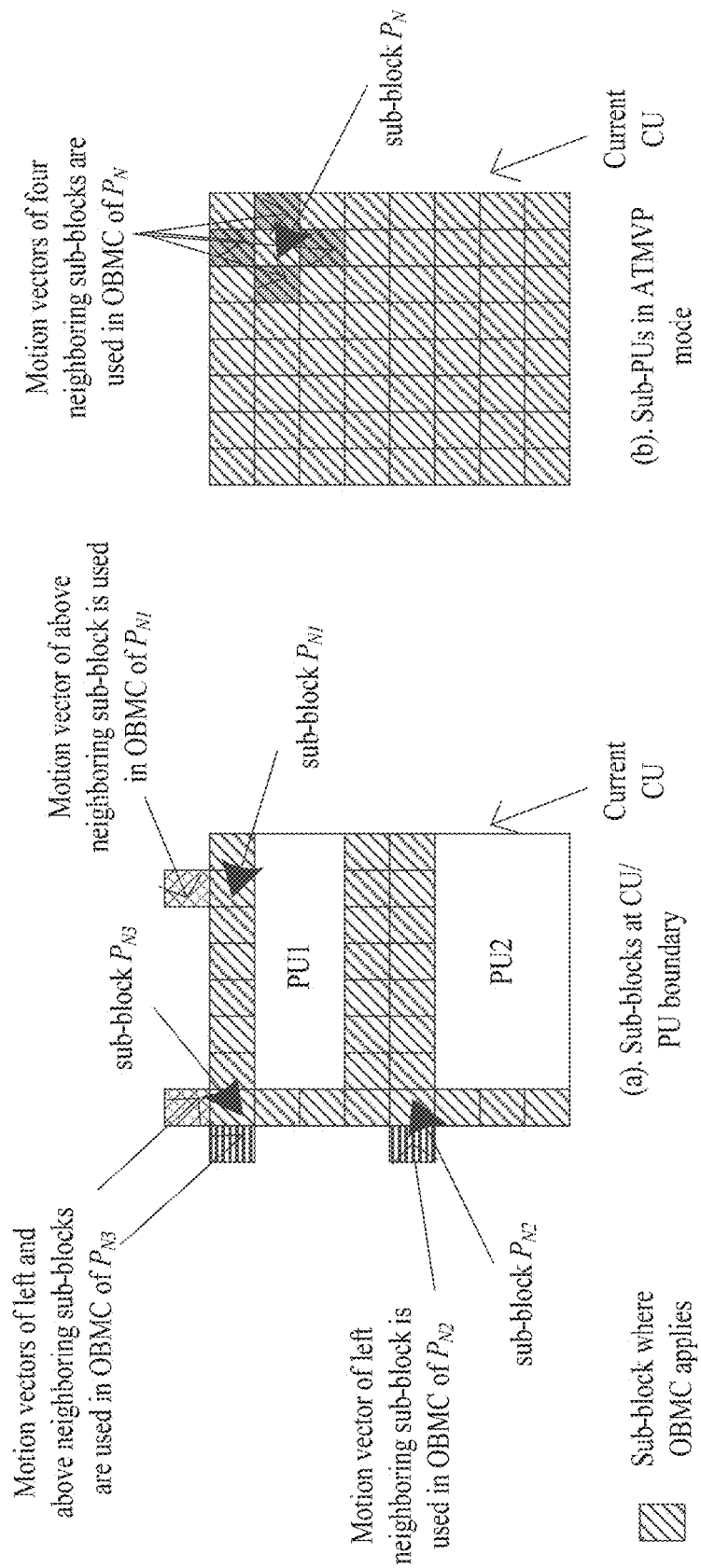
FIG. 12 is an example illustration of sub-blocks where OBMC (overlapped block motion compensation) is applicable.

FIG. 12 is an illustration of sub-blocks where OBMC is applicable.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {1/4, 1/8} are used for $P_N$ and weighting factors {3/4, 7/8} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 13:
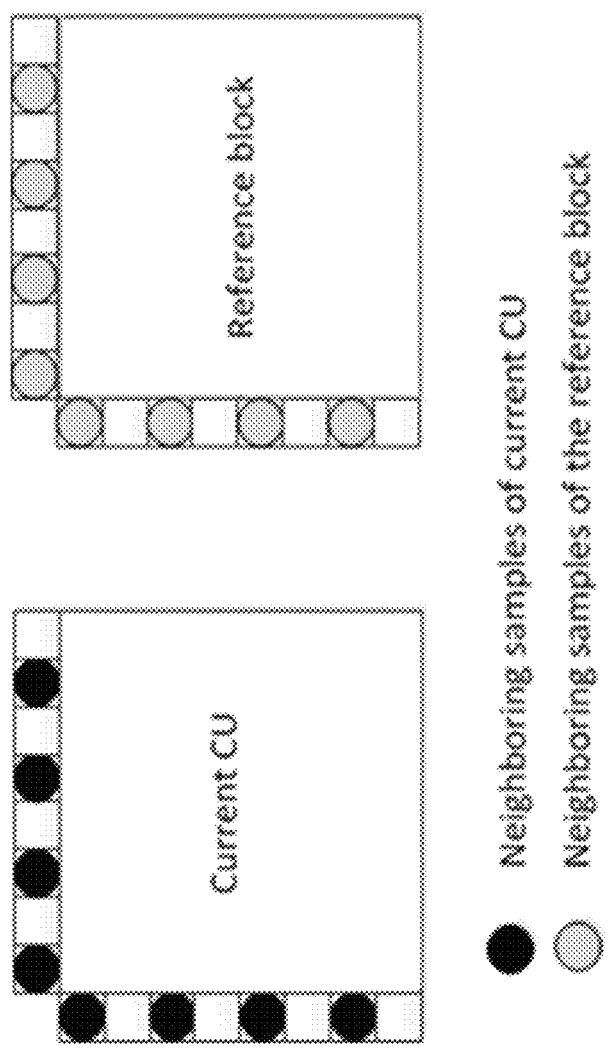
FIG. 13 shows an example of neighbouring samples used for deriving IC parameters.

FIG. 13 shows an example of neighbouring samples used for deriving IC parameters.

When LIC applies for a CU, a least square error method is employed to derive the parameters a and b by using the neighbouring samples of the current CU and their corresponding reference samples. More specifically, as illustrated in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6 Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 14, the affine motion field of the block is described by two control point motion vectors.

Figure 14:
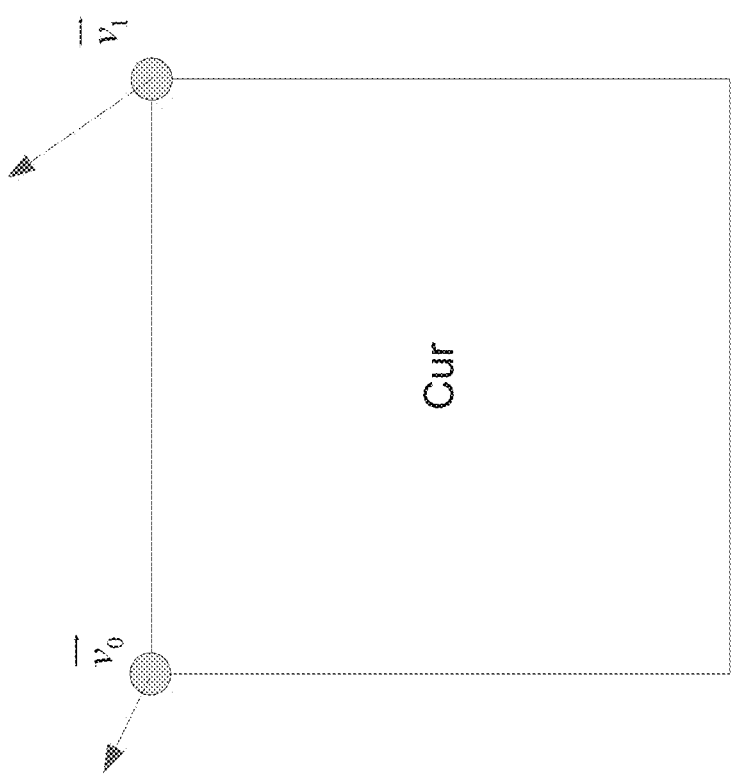
FIG. 14 shows an example of simplified affine motion model.

FIG. 14 shows an example of a simplified affine motion model

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad (2)$$

After derivation by Equation 2, M and N should be adjusted downward if necessary to make it a divisor of w and h, respectively.

Figure 15:
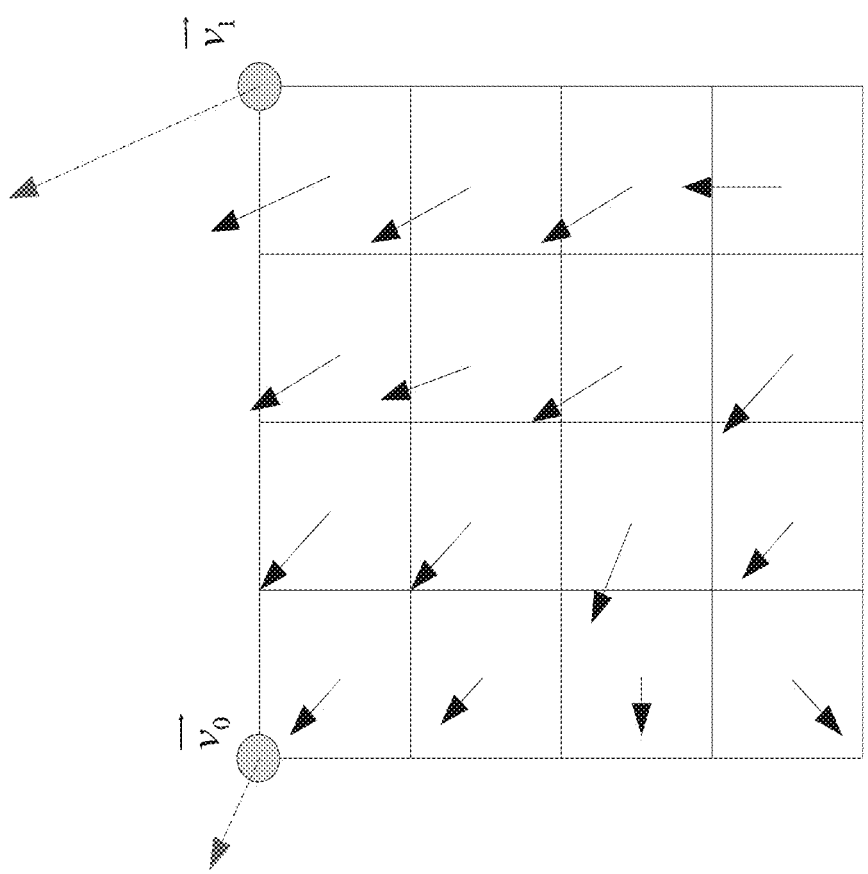
FIG. 15 shows an example of affine MVF (motion vector field) per sub-block.

To derive motion vector of each M×N sub-block, the motion vector of the center sample of each sub-block, as shown in FIG. 15, is calculated according to Equation 1, and rounded to 1/16 fraction accuracy. Then the motion compensation interpolation filters mentioned in section 2.2.3 are applied to generate the prediction of each sub-block with derived motion vector.

FIG. 15 shows an example of affine MVF per sub-block.

After MCP, the high accuracy motion vector of each sub-block is rounded and saved as the same accuracy as the normal motion vector.

2.2.6.1 AF_INTER Mode

Figure 17:
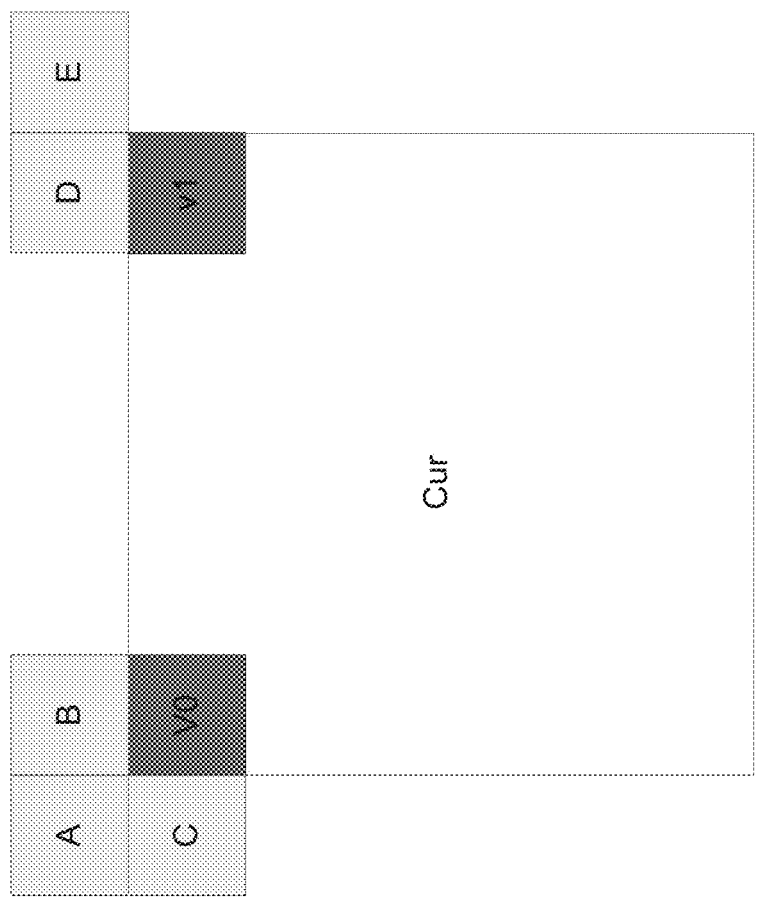
FIG. 17 shows an example of MVP for AF_INTER mode.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown in FIG. 17, $v_0$ is selected from the motion vectors of the block A, B or C. The motion vector from the neighbour block is scaled according to the reference list and the relationship among the picture order count (POC) of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 16B:
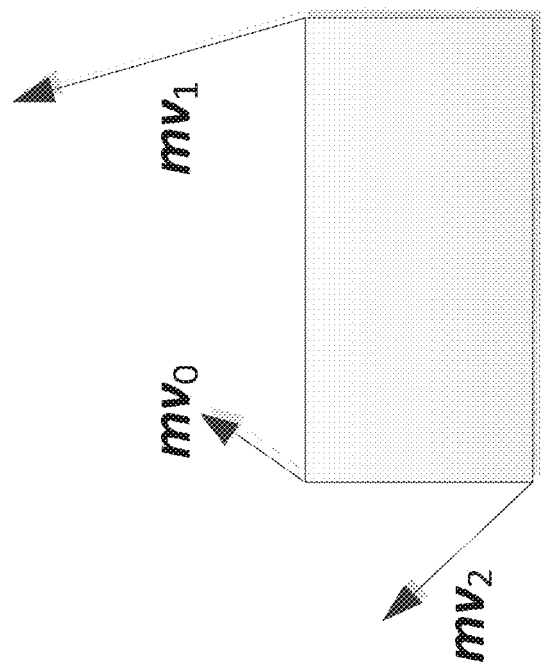
FIGS. 16A and 16B show an example of 4-parameter affine model, and 6-parameter affine model, respectively.
Figure 16A:
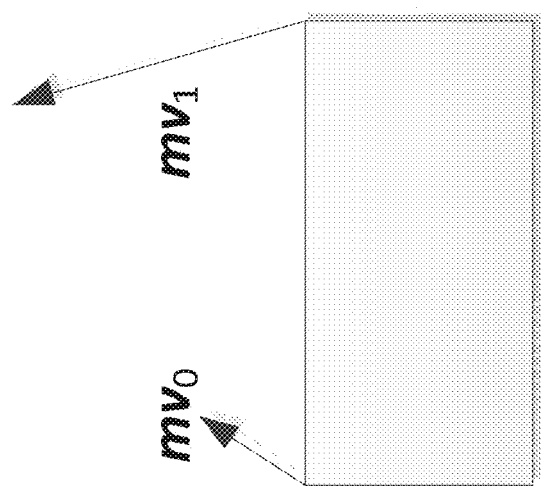

FIGS. 16A and 16B show examples of 4-parameter affine model and 6-parameter affine model, respectively.

FIG. 17 shows an example of MVP for AF_INTER mode.

In AF_INTER mode, when 4/6 parameter affine mode is used, 2/3 control points are required, and therefore 2/3 MVD needs to be coded for these control points, as shown in FIG. 16. In JVET-K0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 16B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.6.2 Fast Affine ME Algorithm in AF_INTER Mode

In affine mode, MV of 2 or 3 control points needs to be determined jointly. Directly searching the multiple MVs jointly is computationally complex. A fast affine ME algorithm is proposed and is adopted into VTM/BMS.

The fast affine ME algorithm is described for the 4-parameter affine model, and the idea can be extended to 6-parameter affine model.

$$\begin{cases} x' = ax + by + c \\ y' = -bx + ay + d \end{cases} \quad (3)$$

$$\begin{cases} mv^h_{(x,y)} = x' - x = (a-1)x + by + c \\ mv^v_{(x,y)} = y' - y = -bx + (a-1)y + d \end{cases} \quad (4)$$

Replace (a−1) with a′, then the motion vector can be rewritten as:

$$\begin{cases} mv^h_{(x,y)} = x' - x = a'x + by + c \\ mv^v_{(x,y)} = y' - y = -bx + a'y + d \end{cases} \quad (5)$$

Suppose motion vectors of the two controls points (0, 0) and (0, w) are known, from Equation (5) we can derive affine parameters, $$\begin{cases} c = mv^h_{(0,0)} \\ d = mv^v_{(0,0)} \end{cases} \quad (6)$$

The motion vectors can be rewritten in vector form as:

$$MV(p) = A(P) * MV_C^T \quad (7)$$

wherein $$A(P) = \begin{Bmatrix} 1 & x & 0 & y \\ 0 & y & 1 & -x \end{Bmatrix} \quad (8)$$

$$MV_C = [\, mv^h_{(0,0)} \quad a \quad mv^v_{(0,0)} \quad b \,] \quad (9)$$

P=(x, y) is the pixel position.

At encoder, MVD of AF_INTER are derived iteratively. Denote MV(P) as the MV derived in the ith iteration for position P and denote $dMV_C^i$ as the delta updated for $MV_C$ in the ith iteration. Then in the (i+1)th iteration, $$MV^{i+1}(P) = A(P) * ((MV_C^i)^T + (dMV_C^i)^T) = \quad (10)$$
$$A(P) * (MV_C^i)^T + A(P) * (dMV_C^i)^T = MV^i(P) + A(P) * (dMV_C^i)^T$$

Denote $Pic_{ref}$ as the reference picture and denote $Pic_{cur}$ as the current picture and denote $Q=P+MV^i(P)$. Suppose we use MSE as the matching criterion, then we need to minimize.

$$\min \sum_P (Pic_{cur}(P) - Pic_{ref}(P + MV^{i+1}(P)))^2 = \quad (11)$$
$$\min \sum_P \left( Pic_{cur}(P) - Pic_{ref}\left(Q + A(P) * (dMV_C^i)^T\right) \right)^2$$

Suppose $(dMV_C^i)^T$ is small enough, we can rewrite $Pic_{ref}$ $(Q+A(P)*(dMV_C^i)^T)$ approximately as follows with 1th order Taylor expansion.

$$Pic_{ref}(Q+A(P)*(dMV_C^i)^T) \approx Pic_{ref}(Q)+Pic_{ref}'(Q)*A(P)* (dMV_C^i)^T \quad (12)$$

wherein $$Pic'_{ref}(Q) = \left[\frac{dPic_{ref}(Q)}{d_x} \frac{dPic_{ref}(Q)}{d_y}\right]. \quad (13)$$

Denote $E^{i+1}(P) = Pic_{cur}(P) - Pic_{ref}(Q)$, $$\min \sum_P \left(Pic_{cur}(P) - Pic_{ref}(Q) - Pic'_{ref}(Q)*A(P)*(dMV_C^i)^T\right)^2 =$$
$$\min \sum_P \left(E^{i+1}(P) - Pic'_{ref}(Q)*A(P)*(dMV_C^i)^T\right)^2.$$

We can derive $dMV_C^i$ by setting the derivative of the error function to zero. Then can then calculate delta MV of the control points (0, 0) and (0, w) according to $A(P)*(dMV_C^i)^T$, $$dMV_{(0,0)}^h = dMV_C^i[0] \quad (14)$$

$$dMV_{(0,w)}^h = dMV_C^i[1]*w + dMV_C^i[2] \quad (15)$$

$$dMV_{(0,0)}^v = dMV_C^i[2] \quad (16)$$

$$dMV_{(0,w)}^v = -dMV_C^i[3]*w + dMV_C^i[2] \quad (17)$$

Suppose such MVD derivation process is iterated by n times, then the final MVD is calculated as follows, $$fdMV_{(0,0)}^h = \Sigma_{i=0}^{n-1} dMV_C^i[0] \quad (18)$$

$$fdMV_{(0,w)}^h = \Sigma_{i=0}^{n-1} dMV_C^i[1]*w + \Sigma_{i=0}^{n-1} dMV_C^i[0] \quad (19)$$

$$fdMV_{(0,w)}^v = \Sigma_{i=0}^{n-1} dMV_C^i[2] \quad (20)$$

$$fdMV_{(0,w)}^v = \Sigma_{i=0}^{n-1} -dMV_C^i[3]*w + \Sigma_{i=0}^{n-1} dMV_C^i[2] \quad (21)$$

With JVET-K0337, i.e., predicting delta MV of control point (0, w), denoted by $mvd_1$ from delta MV of control point (0, 0), denoted by $mvd_0$, now actually only $(\Sigma_{i=0}^{n-1} dMV_C^i[1]*w, -\Sigma_{i=0}^{n-1} -dMV_C^i[3][3]*w)$ is encoded for $mvd_1$.

2.2.6.3 AF_MERGE Mode

Figures 18A, 18B:
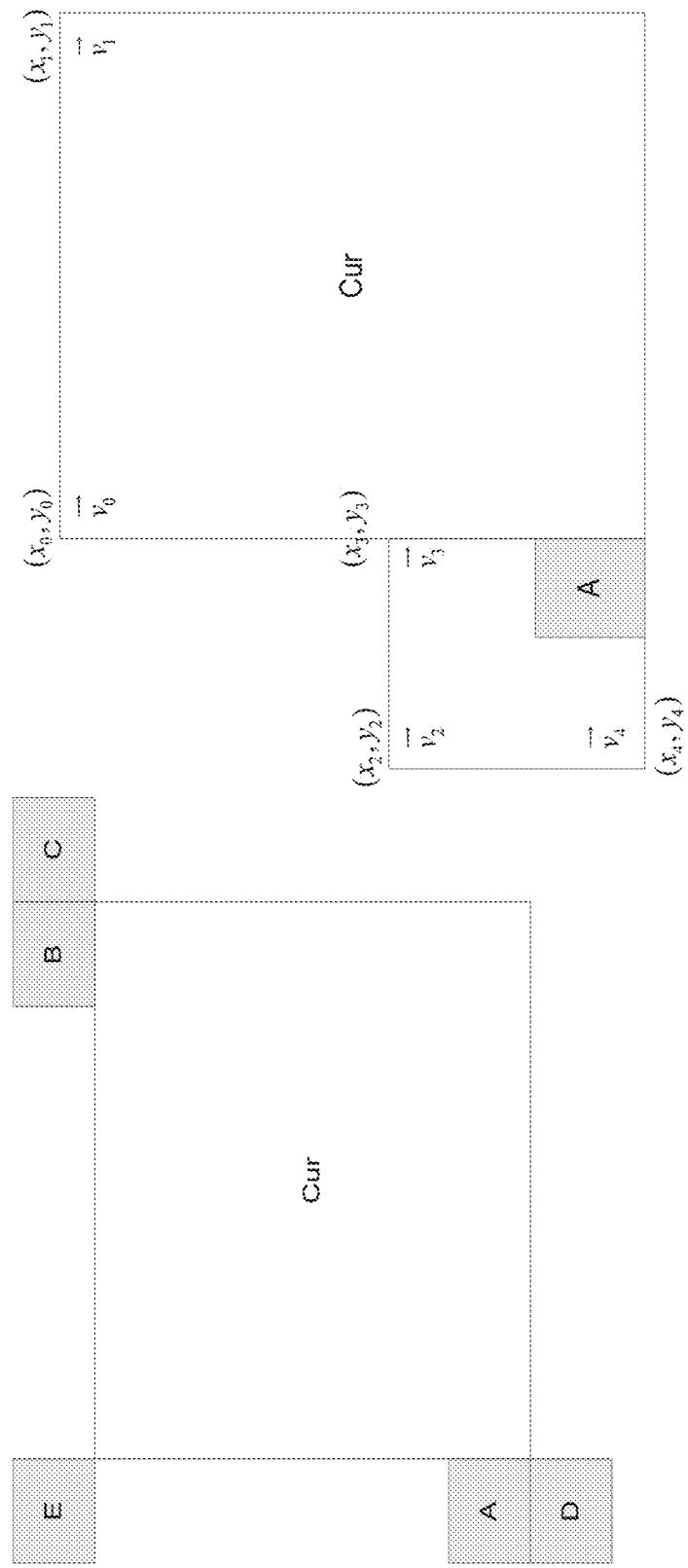
FIGS. 18A and 18B show example Candidates for AF_MERGE mode.

When a CU is applied in AF_MERGE mode, it gets the first block coded with affine mode from the valid neighbour reconstructed blocks. And the selection order for the candidate block is from left, above, above right, left bottom to above left as shown in FIG. 18A. If the neighbour left bottom block A is coded in affine mode as shown in FIG. 18B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

FIGS. 18A and 18B show example candidates for AF_MERGE.

2.2.7 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad (22)$$

Figure 19:
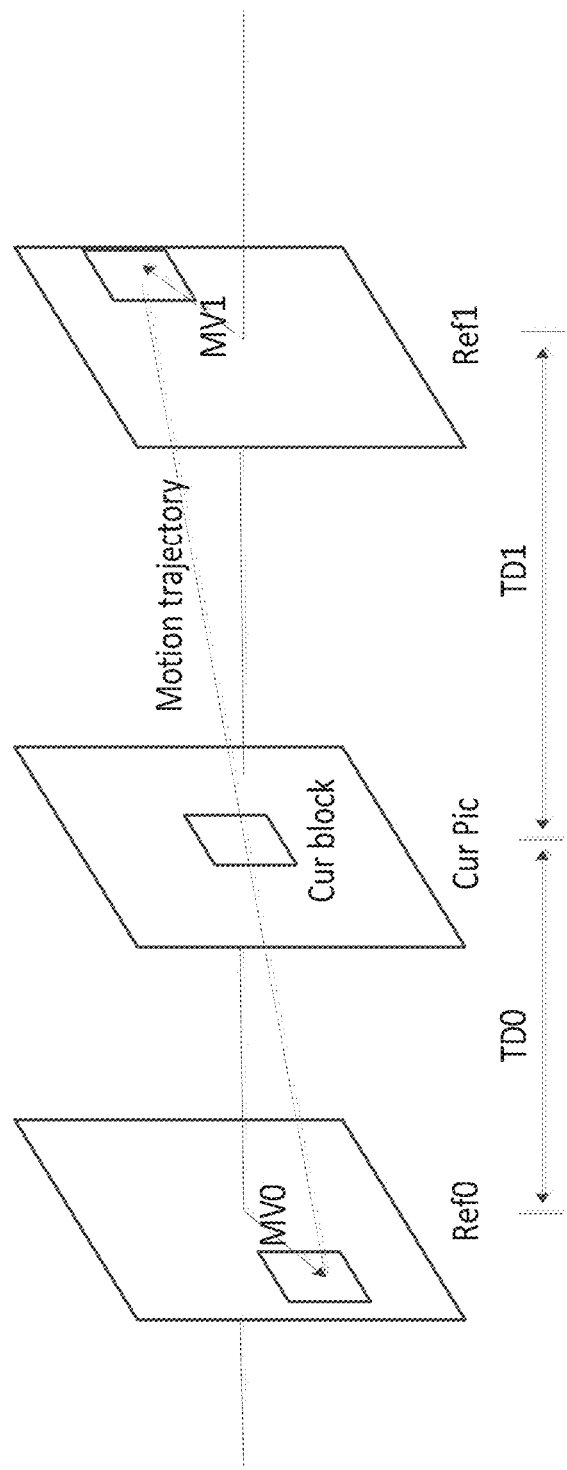
FIG. 19 shows an example of bilateral matching.

As shown in the FIG. 19, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 20:
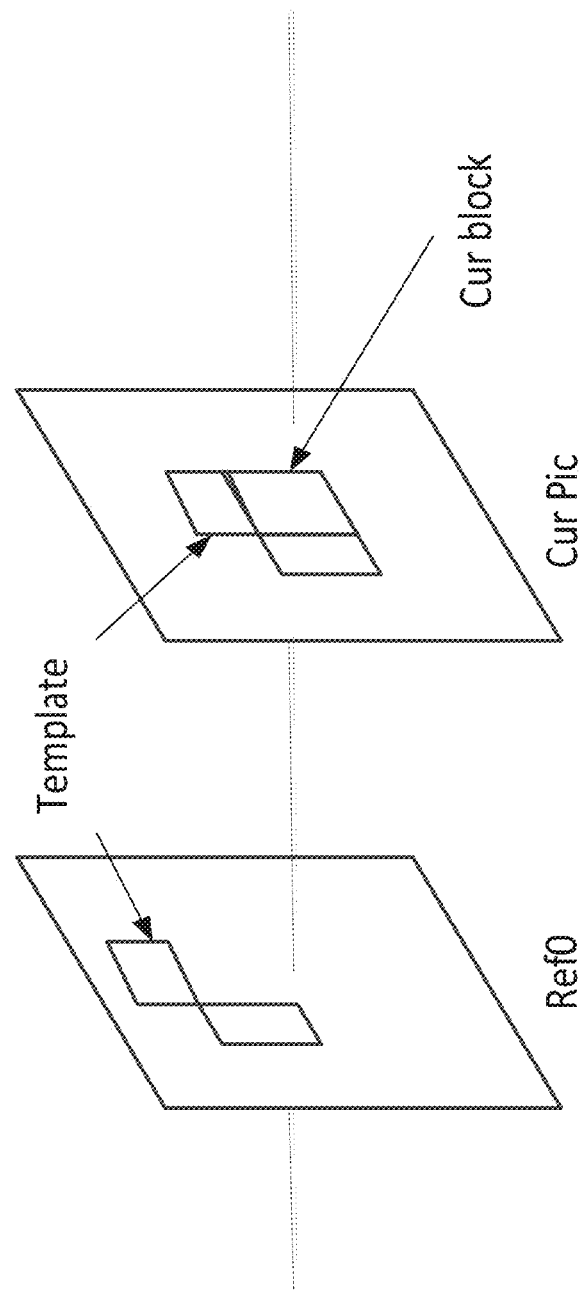
FIG. 20 shows an example of template matching.

As shown in FIG. 20, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.7.1 CU Level MV Candidate Set

The MV candidate set at CU level consists of:
(i) Original AMVP candidates if the current CU is in AMVP mode
(ii) all merge candidates,
(iii) several MVs in the interpolated MV field, which is introduced in section 2.2.7.3.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.7.2 Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.7.3 Generation of Interpolated MV Field

Before coding a frame, interpolated motion field is generated for the whole picture based on unilateral ME. Then the motion field may be used later as CU level or sub-CU level MV candidates.

Figure 21:
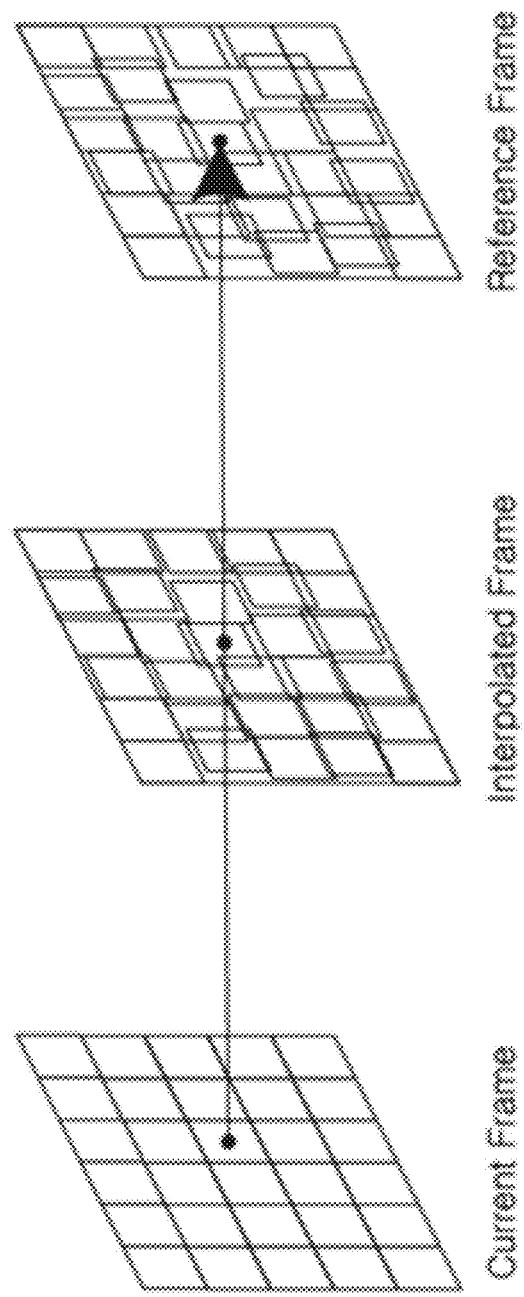
FIG. 21 depicts an example of using unilateral motion estimation (ME) in frame rate upconversion (FRUC).

First, the motion field of each reference pictures in both reference lists is traversed at 4×4 block level. For each 4×4 block, if the motion associated to the block passing through a 4×4 block in the current picture (as shown in FIG. 21) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the blocks motion is marked as unavailable in the interpolated motion field.

FIG. 21 shows an example of unilateral ME in FRUC 2.2.7.4 Interpolation and Matching Cost When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \qquad (23)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.7.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.7.6 Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
   bi-prediction is used;
Otherwise, if cost0<=cost1
   uni-prediction from list0 is used;
Otherwise,
   uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2.8 Bi-Directional Optical Flow

Bi-directional optical flow (BIO) is sample-wise motion refinement which is performed on top of block-wise motion compensation for bi-prediction. The sample-level motion refinement doesn't use signalling.

Figure 22:
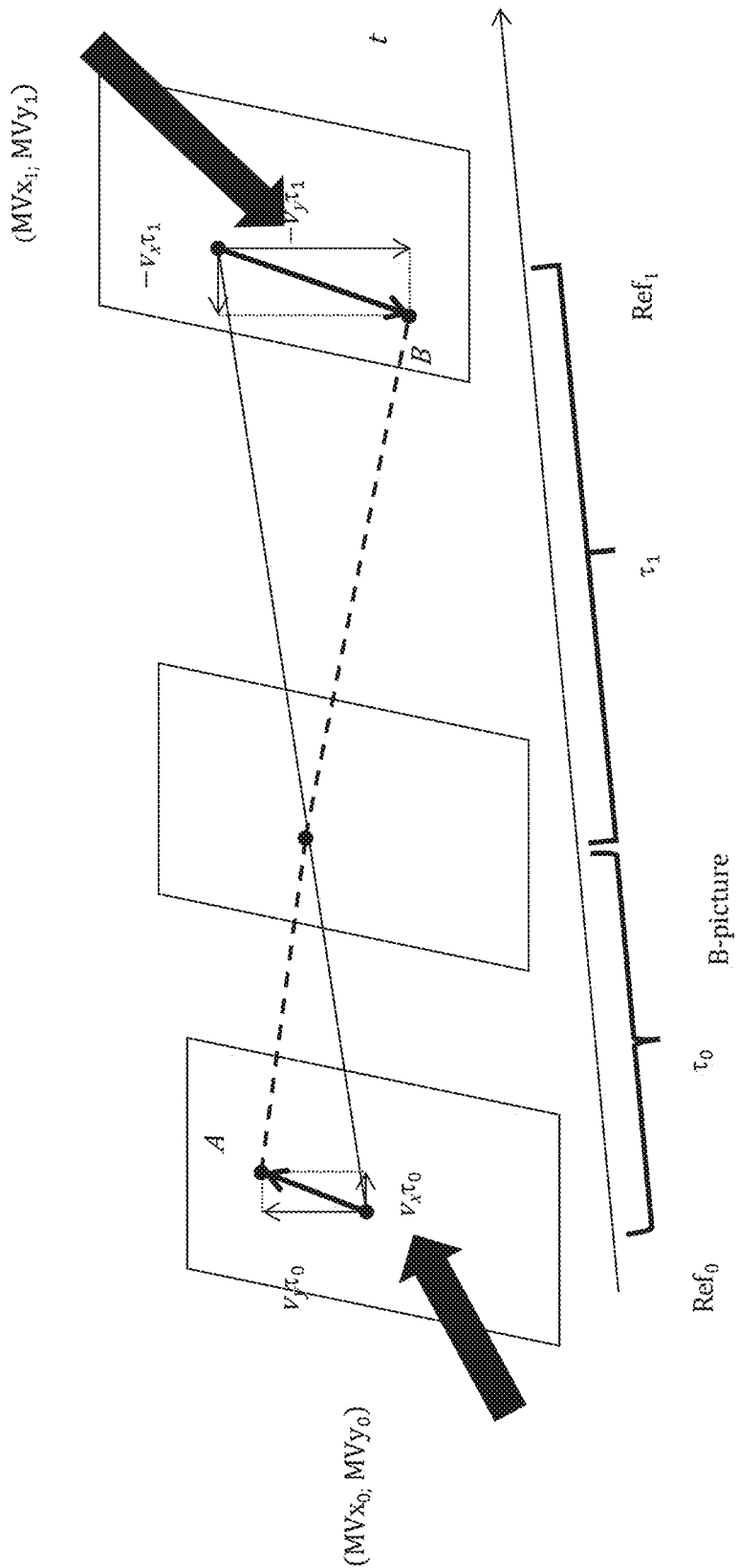
FIG. 22 shows an example of optical flow trajectory.

FIG. 22 shows an example of an optical flow trajectory.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0 \tag{24}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \tag{25}$$

Here, $\tau_0$ and $\tau_1$ denote the distances to the reference frames as shown on a FIG. 22. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion (MVx$_0$, MVy$_0$, MVx$_1$, MVy$_1 \neq 0$) and the block motion vectors are proportional to the time distance (MVx$_0$/MVx$_1$ = MVy$_0$/MVy$_1$ = −$\tau_0$/$\tau_1$).

The motion vector field $(v_x, v_y)$ is determined by minimizing the difference Δ between values in points A and B (intersection of motion trajectory and reference frame planes on FIG. 9). Model uses only first linear term of a local Taylor expansion for Δ:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \tag{26}$$

All values in Equation 26 depend on the sample location (i', j'), which was omitted from the notation so far. Assuming the motion is consistent in the local surrounding area, we minimize Δ inside the (2M+1)×(2M+1) square window Ω centered on the currently predicted point (i, j), where M is equal to 2:

$$(v_x, v_y) = \underset{v_x, v_y}{\text{argmin}} \sum_{[i',j] \in \Omega} \Delta^2[i', j'] \tag{27}$$

For this optimization problem, the JEM uses a simplified approach making first a minimization in the vertical direction and then in the horizontal direction. This results in $$v_x = (s_1 + r) > m ? clip3\left(-thBIO, thBIO, -\frac{s_3}{(s_1 + r)}\right) : 0 \tag{28}$$

$$v_y = (s_5 + r) > m ? clip3\left(-thBIO, thBIO, -\frac{s_6 - v_x s_2/2}{(s_5 + r)}\right) : 0 \tag{29}$$

where, $$s_1 = \sum_{[i',j] \in \Omega} (\tau_1 \partial I^{(1)}/\partial x + \tau_0 \partial I^{(0)}/\partial x)^2; \tag{30}$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations 28 and 29.

$$r = 500 \cdot 4^{d-8} \tag{31}$$

$$m = 700 \cdot 4^{d-8} \tag{32}$$

Here d is a bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 30, (2M+1)×(2M+1) square window Ω centered in currently predicted point on a boundary of predicted block needs to accesses positions outside of the block (as shown in FIG. 23A. In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 23B.

Figure 23B:
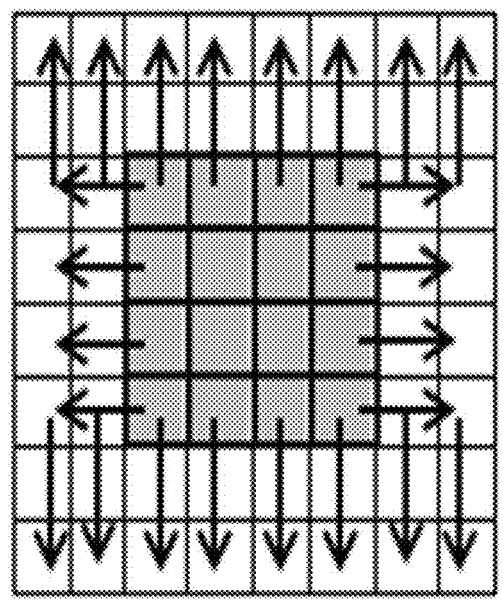
FIGS. 23A and 23B show examples of BIO without block extension.
Figure 23A:
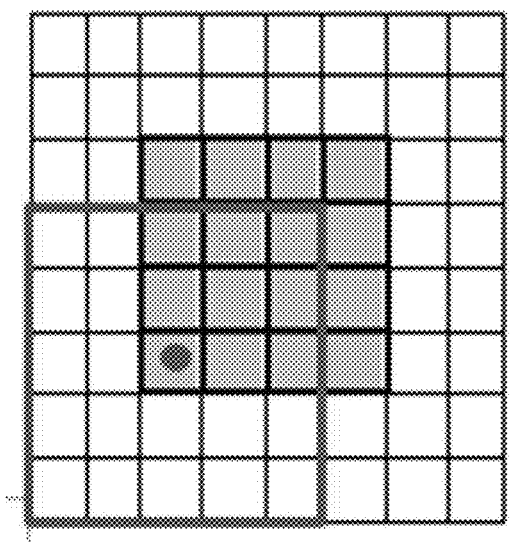

FIG. 23A-23B show BIO w/o block extension. FIG. 23A shows access positions outside of the block. In FIG. 23B, padding is used in order to avoid extra memory access and calculations.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 30 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y) \in b_k} \sum_{[i',j] \in \Omega(x,y)} (\tau_1 \partial I^{(1)}/\partial x + \tau_0 \partial I^{(0)}/\partial x)^2; \tag{33}$$

$$s_{3,b_k} = \sum_{(x,y) \in b_k} \sum_{[i',j] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j] \in \Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$s_{5,b_k} = \sum_{(x,y) \in b_k} \sum_{[i',j] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j] \in \Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 28 and 29 are replaced by $((s_{n,b_k}) >> 4)$ to derive the associated motion vector offsets.

In some cases, MV regiment of BIO might be unreliable due to noise or irregular motion. Therefore, in BIO, the magnitude of MV regiment is clipped to a threshold value the BIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d-8, then gradient filter BIOfilterG is applied in horizontal direction corresponding to the fractional position fracX with de-scaling shift by 18*d. In case of vertical gradient $\partial I/\partial y$ first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient(BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
| --- | --- |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.9 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
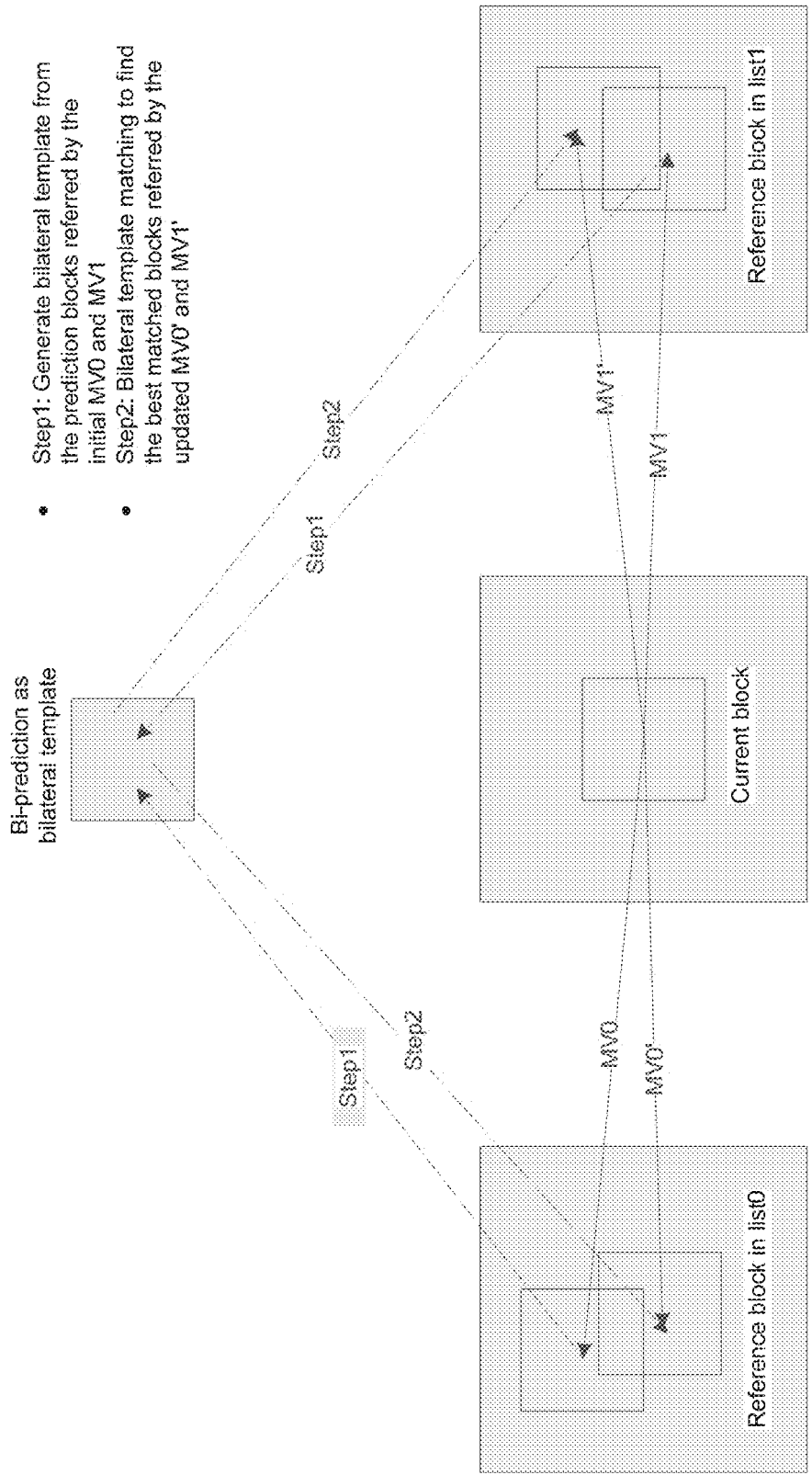
FIG. 24 shows an example of DMVR (decoder-side motion vector refinement) based on bilateral template matching.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

FIG. 24 shows an example of DMVR based on bilateral template matching

3. Limitations of Present Day Implementations

In AF_INTER mode, when generating affine MVP candidate list, the candidates are clipped to be within a certain range depending on the position of the current PU, the picture size and the largest coding unit (LCU) size etc. This is not necessary because such a clip operation will be performed in the motion compensation process. Meanwhile, in affine mode or ATMVP mode, motion compensation is performed at 4×4 block level, this increase the bandwidth when compared with 4×8, 8×4 or 8×8 blocks.

In AF_INTER mode, when encoding $mvd_1$, $(\Sigma_{i=0}^{n-1} dMV_C^i[1]*w, -\Sigma_{i=0}^{n-1} dMV_C^i[3]*w)$ is encoded. It depends on width of the PU/CU and can be with different scale for different PU/CU width. It may be not necessary to encode a too large $(\Sigma_{i=0}^{n-1} dMV_C^i[1]*w, -\Sigma_{i=0}^{n-1} -dMV_C^i[3]*w)$ for large PU/CU.

In PCT/CN2018/098691, incorporated herein by reference, adaptive MVD precision is proposed for AF_INTER mode.

4. Example Embodiments

To tackle the problems, we propose, among other solutions, to remove the clip operation required in the affine MVP candidate list construction process, meanwhile, perform motion compensation at a larger block size but store the motion information at 4×4 block level for the right/bottom PU/CU boundary.

The detailed embodiments below should be considered as examples to explain general concepts. These embodiments should not be interpreted in a narrow way. Furthermore, these embodiments can be combined with each other in a manner that provides improvements in video coding.

Figure 25B:
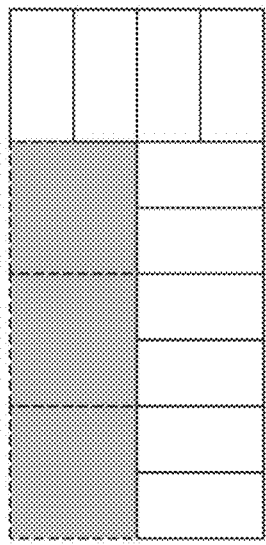
FIGS. 25A-25E show examples of deriving MVstore for inner subblocks and boundary subblocks of a PU/CU.
Figure 25D:
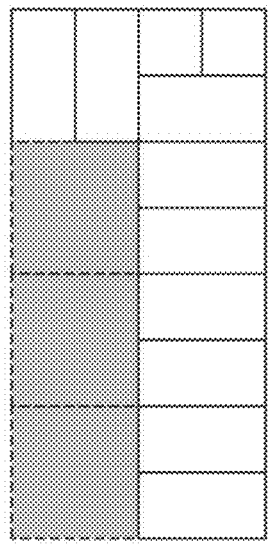
Figure 25A:
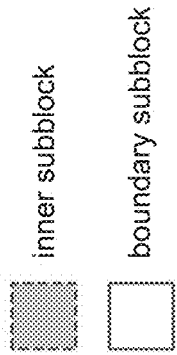
Figure 25A:
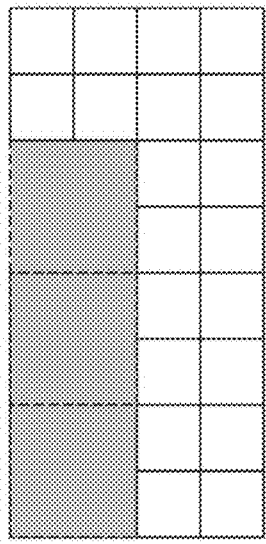
Figure 25C:
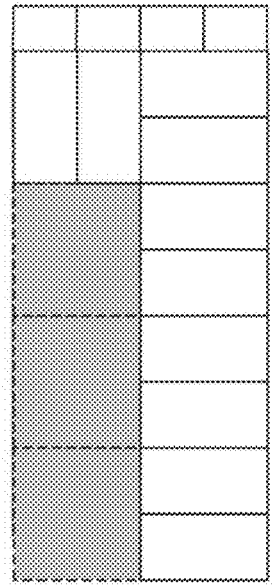
Figure 25E:
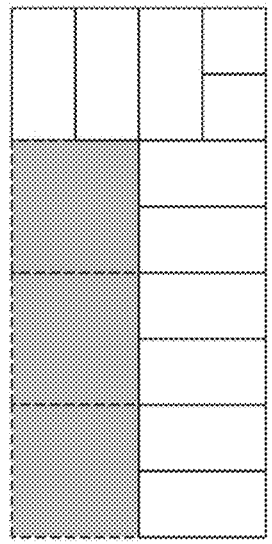

4.1 Improvement of Affine Mode
1. It is proposed to remove the clip operation required in the affine MVP candidate list construction process.
    a. In one example, furthermore, clipping operations are only invoked in the motion compensation stage.
2. It is proposed that in affine mode, ATMVP mode or any subblock coding tool, the motion information used for motion compensation (denoted by $MV_{mc}$) and the stored motion information (denoted by $MV_{store}$) used for motion prediction of future PUs/CUs/blocks, can be derived at different block sizes.
    a. In one example, $MV_{mc}$ is derived at M1×N1 block size but $MV_{store}$ is derived at M2×N2 block size, wherein M1, M2, N1 and N2 are positive integers and it is not allowed to have M1 equal to M2 and N1 equal to N2. For example, M1 and N1 are set equal to 8, and M2 and N2 are set equal to 4.
    b. In one example, $MV_{mc}$ is derived at M1×N1 block size, and $MV_{store}$ is derived at M2×N2 block size for inner subblocks but is derived at M3×N3 block size for boundary subblocks. Inner subblocks and boundary subblocks as illustrated in FIG. 25A. For example, M1 and N1 are set equal to 8, and M2 and N2 are set equal to 8, and M3 and N3 are set equal to 4.
    c. Alternatively, when deriving $MV_{store}$, rectangular block shape M×N is used for boundary subblocks. For right boundary, block size with M>N is used, while for bottom boundary block size with M<N is used. For the bottom-right boundary, it can be derived same with right boundary as shown in FIG. 25B or bottom boundary as shown in FIG. 25C.
        i. Alternatively, the bottom-right boundary is derived at a smaller block size than the right boundary or the bottom boundary as shown in FIGS. 25D and 25E.
    d. In one example, $MV_{mc}$ is derived from $MV_{store}$; Alternatively, $MV_{store}$ is derived from $MV_{mc}$.
3. It is proposed that when encoding $mvd_1$, instead of encoding $(\Sigma_{i=0}^{n-1} dMV_C^i *w, -\Sigma_{i=0}^{n-1} dMV_C^i[3]*w))$, a rounding operation given by $((\Sigma_{i=0}^{n-1} dMV_C^i *w+o(w))>>k(w), (\Sigma_{i=0}^{n-1} -dMV_C^i[3]*w+o(w))>>k(w))$ is used, wherein k(w) is a non-negative integer and is different for different PU/CU width, and o(w) is an offset (for example, equal to 1<<(k(w)−1)), wherein dMVic [1], dMVic [3] denote the horizontal and vertical motion vector difference of the top-right control point for 4-parameter affine model derived in the ith iteration. Similar idea can be extended to 6 parameter affine mode.
    a. In one example, k(w) a non-decreasing function of w. For example, $$k(w) = \begin{cases} 2 & \text{if } w = 128 \\ 1 & \text{if } w = 64 \\ 0 & \text{else} \end{cases}$$

4. It is proposed that when a precision Prec (i.e., MV is with 1/(2^Prec) precision) is used for encoding MVD in AF_INTER mode, same precision is used when constructing the affine MVP list, that is, MVs (a neighboring block's MV is denoted by MVPred(MVPred$_X$, MVPred$_Y$) and its precision by PredPrec) associated with neighboring blocks may need to be modified firstly before being used as MV predictors.
    a. In one example, scaling based on the selected Prec and the precision of MVs associated with neighboring blocks may be invoked.
    b. In one example, if PredPrec>Prec, then MVPred'$_X$=round(MVPred$_X$, PredPrec−Prec), MVPred'$_Y$=round(MVPred$_Y$, PredPrec−Prec). The function round(a, b) may be defined as: (a+offset)>>b, in one example, offset is set to (1<<(b−1)).
    c. In one example, if PredPrec>Prec, MVPred'$_X$=round(MVPred$_X$, PredPrec−Prec), MVPred'$_Y$=round(MVPred$_Y$, PredPrec−Prec), wherein round(MV, deltaPrec)=MV>>deltaPrec.
    d. In one example, if PredPrec<Prec, MVPred'$_X$=MVPred$_X$<<(PredPrec−Prec), MVPred'$_Y$=MVPred$_Y$<<(PredPrec−Prec).
    e. In one example, the MVs of neighbouring affine-coded blocks are rounded before they are used to derive the MVP of the current block.
    f. Alternatively, the MVP of the current block is derived from MVs of neighbouring affine-coded blocks without rounding, then the MVP is rounded.
    g. Alternatively, precision of the neighboring MV is not changed, and only the MVD precision is aligned to Prec.
5. When there are more than 1 MVD (such as 4/6-parameter affine) that need to be coded, different precisions may be applied for different MVDs.
    a. In one example, for 4-parameter affine model, if the second MVD (MVD of the top-right pixel) is predicted from the first MVD (MVD of the top-left pixel), it is coded with higher precision than the first MVD.
    b. In one example, for 6-parameter affine model, if the second MVD (MVD of the top-right pixel) and/or the third MVD (MVD of the left-bottom pixel) are predicted from the first MVD (MVD of the top-left pixel), they are coded with higher precision than the first MVD.
6. Indications of usage of different MVD precisions used in AF_INTER mode may be signaled in SPS/sequence header/VPS/PPS/Slice header/picture header/CTU/CU/group of CTUs/CTU rows.
    a. The signaling of MVD precisions may depend on coded mode information, such as blocks size/block shapes/slice types/number of affine parameters (4-parameter or 6-parameter)/temporal layers.
    b. Alternatively, the usage may be automatically disabled for certain conditions, such as block contains less than 16 samples. In this case, the signaling of MVD precisions is always skipped.

Figure 26:
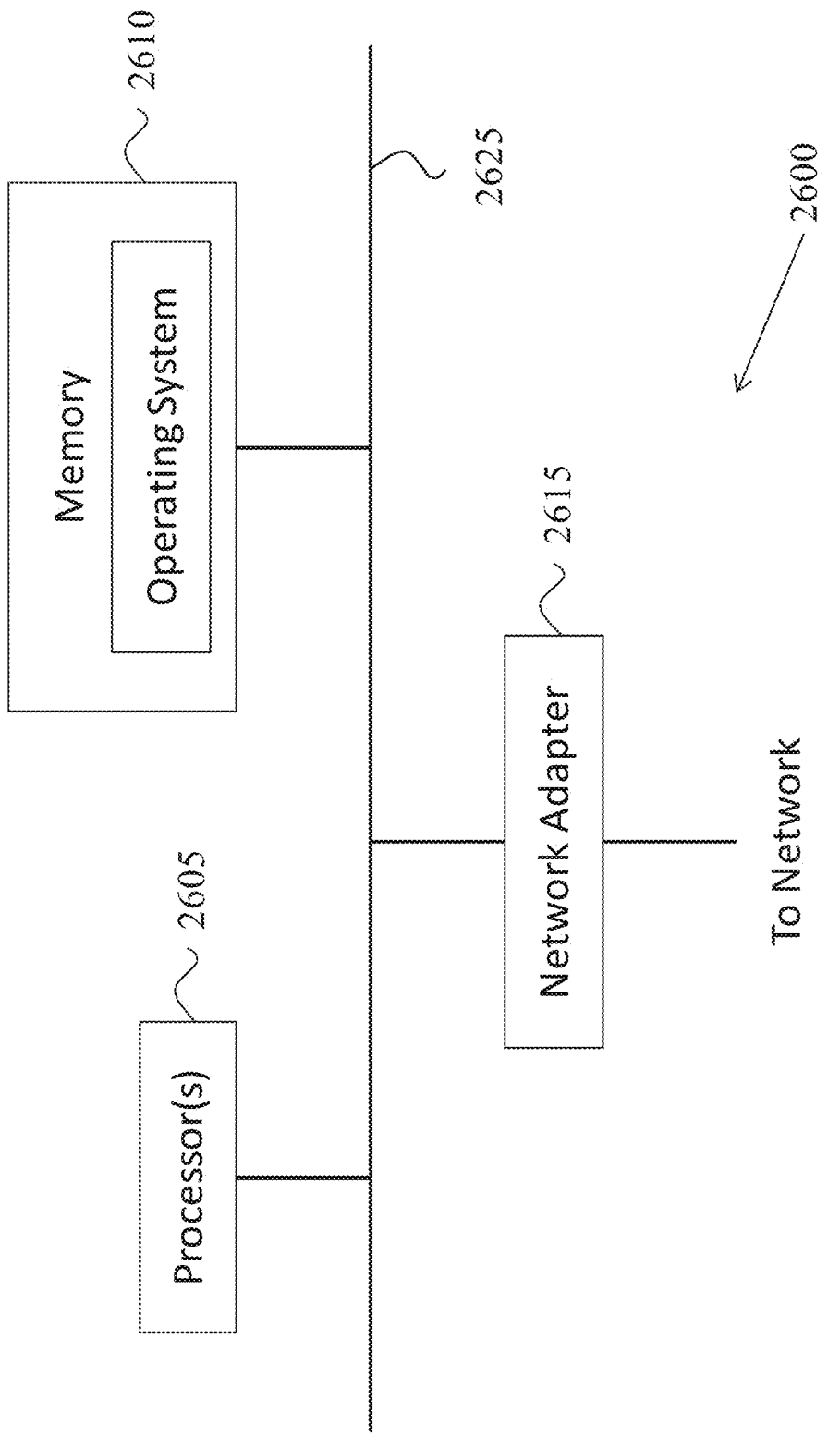
FIG. 26 is a block diagram illustrating an example of the architecture for a computer system or other control device that can be utilized to implement various portions of the presently disclosed technology.

FIG. 26 is a block diagram illustrating an example of the architecture for a computer system or other control device 2600 that can be utilized to implement various portions of the presently disclosed technology. In FIG. 26, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 27:
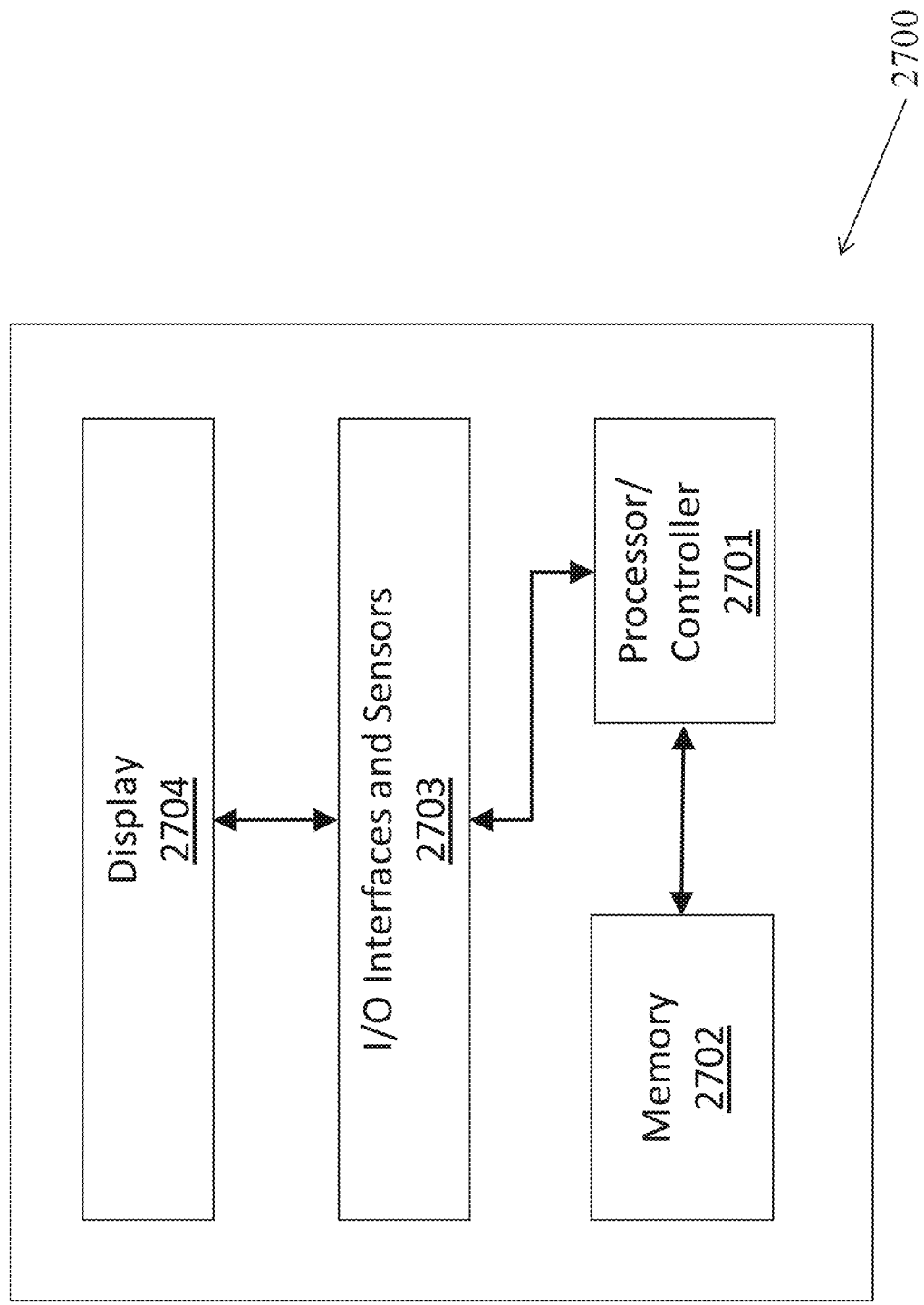
FIG. 27 shows a block diagram of an example embodiment of a mobile device that can be utilized to implement various portions of the presently disclosed technology.

FIG. 27 shows a block diagram of an example embodiment of a mobile device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 28:
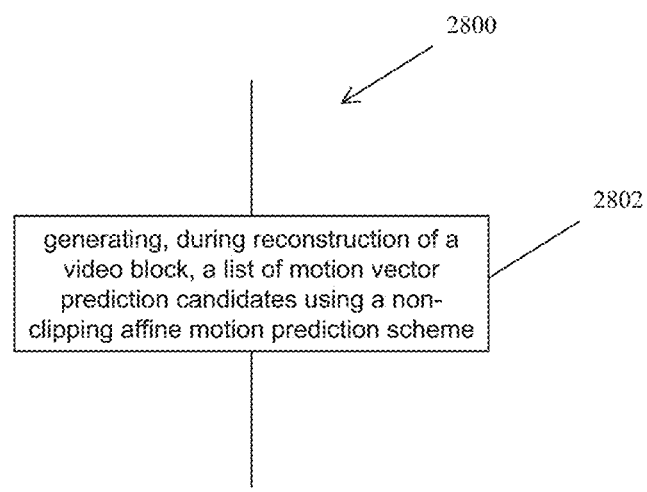
FIG. 28 is a flowchart for an example method of video processing.

FIG. 28 is a flowchart for an example method 2800 of processing video. The method 2800 includes generating (2802), during reconstruction of a video block, a list of motion vector prediction candidates using an affine motion prediction scheme such that values of the motion vector prediction candidates are calculated in absence of a clipping operation that limits the values to a threshold. For example, unlike prior art, which performs clipping during calculation of affine motion vectors, the method 2800 may use a non-clipping based calculation, as described in the present document.

In some embodiments, the method 2800 may including performing motion compensation of the video block using the clipping operation. Examples of the clipping operations are described in Section 4.1, Example 1.

Figure 29:
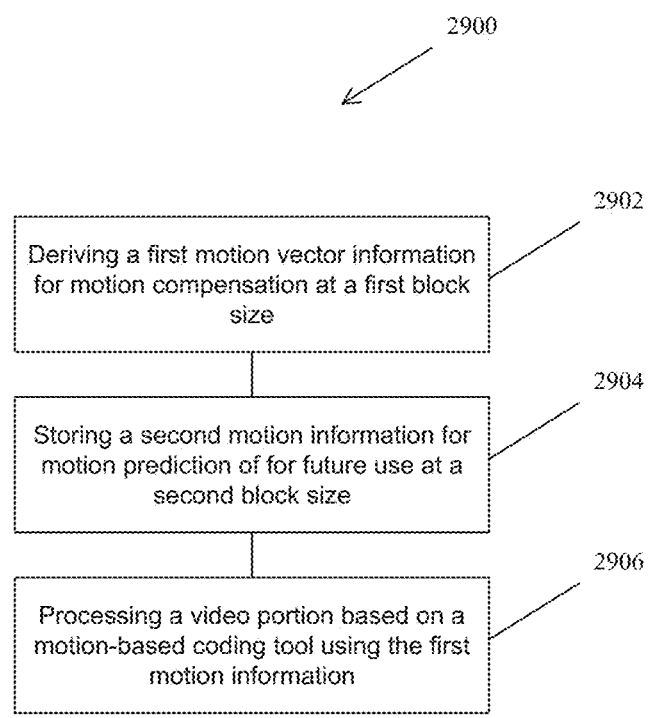
FIG. 29 is a flowchart for an example method of video coding.

FIG. 29 is a flowchart for an example method 2900 of video coding. The method 2900 includes processing (2906) a portion of a video picture using a motion-based coding tool by deriving (2902) a first motion information for motion compensation at a first block size and storing (2904) a second motion information for motion prediction of a future portion of the video picture at a second block size different from the first block size. For example, the portion of the video may be a video block or a coding unit. The processing operation may include decompression or block reconstruction or compression or bitstream generation performed during encoding of the video picture into its bitstream representation.

In some embodiments, the motion-based coding tool includes affine motion compensation. In some embodiments, the motion-based coding tool includes ATMVP. Section 4.1, Example 2 provides additional embodiment examples for method 2900.

In some embodiments, video processing may be performed using a method that includes reconstructing a video block using a bitstream representation of the video block. The bitstream representation includes encoded motion vector difference information for the video block using:

$$\left(\left(\sum_{i=0}^{n-1} dMV_C^i[1] * w + o(w)\right) \gg k(w), \left(-\sum_{i=0}^{n-1} -dMV_C^i[3] * w + o(w)\right) \gg k(w)\right)$$

Where k(w) is a non-negative integer and is different for different PU/CU width, and o(w) is an offset (for example, equal to 1<<(k(w)−1)). Additional examples of embodiments of this method are provided in Section 4.1, Example 3.

In yet another aspect, a video processing method is disclosed. The method includes constructing, during generating a video block from a bitstream representation thereof, a list of affine motion vector predictors using a precision that is same as a precision used for encoding motion vector differences in AF_INTER mode in the bitstream representation. Additional embodiment examples of this method are described in Section 4.1, Example 4.

In yet another aspect, a disclosed method of video encoding or decoding uses a bitstream representation of a video block in which more than one motion vector differences in affine mode are coded for the video block and precision of at least two of the more than one motion vector differences are different. In some implementations, each of the motion vector difference may have its own bit precision associated by either a pre-determined rule, or based on a decision that is implicitly or explicitly indicated in the bitstream representation. Additional examples of embodiments of this method are described in Section 4.1, Examples 5 and 6.

In some embodiments, the video decoding methods may be implemented using a decoding apparatus that is implemented on a hardware platform as described with respect to FIG. 26 and FIG. 27.

Figure 30:
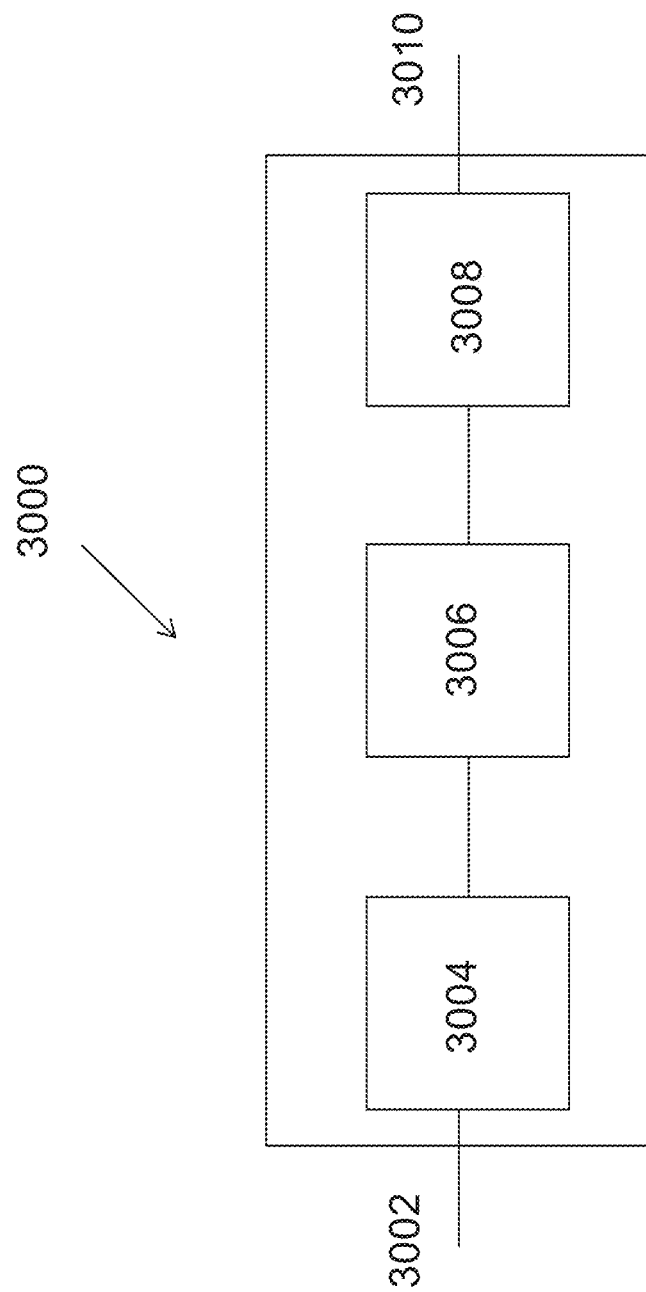
FIG. 30 is a block diagram of an example video processing system in which disclosed techniques may be implemented.

FIG. 30 is a block diagram showing an example video processing system 3000 in which various techniques disclosed herein may be implemented. Various implementations may include some or all of the components of the system 3000. The system 3000 may include input 3002 for receiving video content. The video content may be received in a raw or uncompressed format, e.g., 8 or 10 bit multi-component pixel values, or may be in a compressed or encoded format. The input 3002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3000 may include a coding component 3004 that may implement the various coding or encoding methods described in the present document. The coding component 3004 may reduce the average bitrate of video from the input 3002 to the output of the coding component 3004 to produce a coded representation of the video. The coding techniques are therefore sometimes called video compression or video transcoding techniques. The output of the coding component 3004 may be either stored, or transmitted via a communication connected, as represented by the component 3006. The stored or communicated bitstream (or coded) representation of the video received at the input 3002 may be used by the component 3008 for generating pixel values or displayable video that is sent to a display interface 3010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 31:
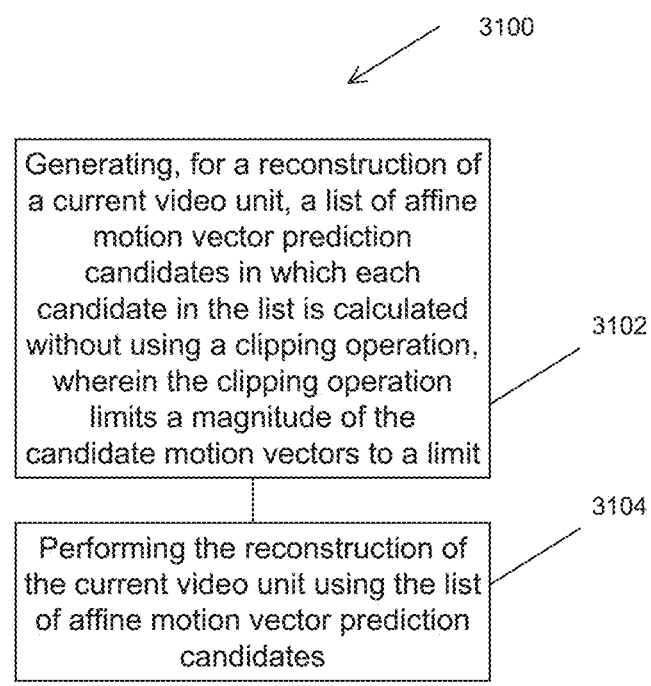
FIG. 31 is a flowchart for an example method of video processing.

FIG. 31 is a flowchart for an example method 3100 of video processing. The steps of this flowchart are generally directed at example 1 in Section 4.1 of this patent document. The method 3100 includes generating (3102), for a reconstruction of a current video unit, a list of affine motion vector prediction candidates in which each candidate in the list is calculated without using a clipping operation, wherein the clipping operation limits a magnitude of the candidate motion vectors to a limit. The method 3100 also includes performing (3104) the reconstruction of the current video unit using the list of affine motion vector prediction candidates.

Figure 32:
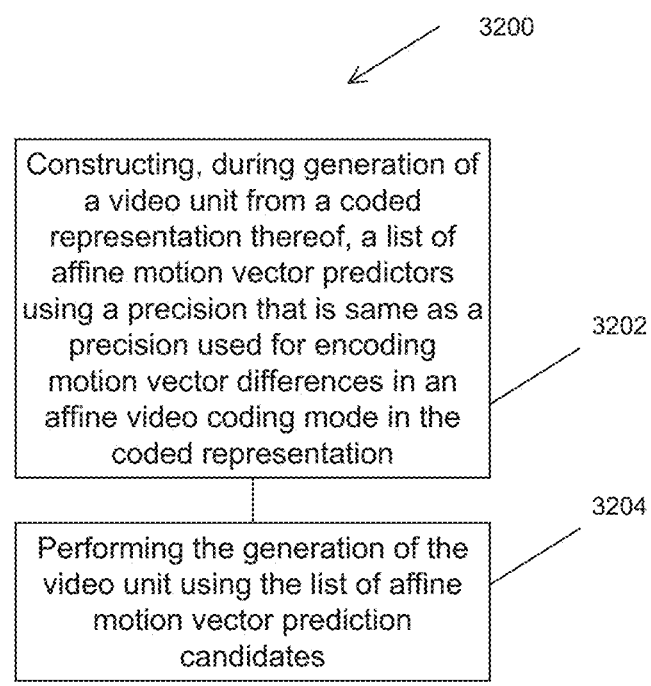
FIG. 32 is a flowchart for an example method of video processing.

FIG. 32 is a flowchart for an example method of video processing. The steps of this flowchart are generally directed at example 4 in Section 4.1 of this patent document. The method 3200 includes constructing (3202), during generation of a video unit from a coded representation thereof, a list of affine motion vector predictors using a precision that is same as a precision used for encoding motion vector differences in an affine video coding mode in the coded representation. The method 3200 also includes performing (3204) the generation of the video unit using the list of affine motion vector prediction candidates.

Figure 33:
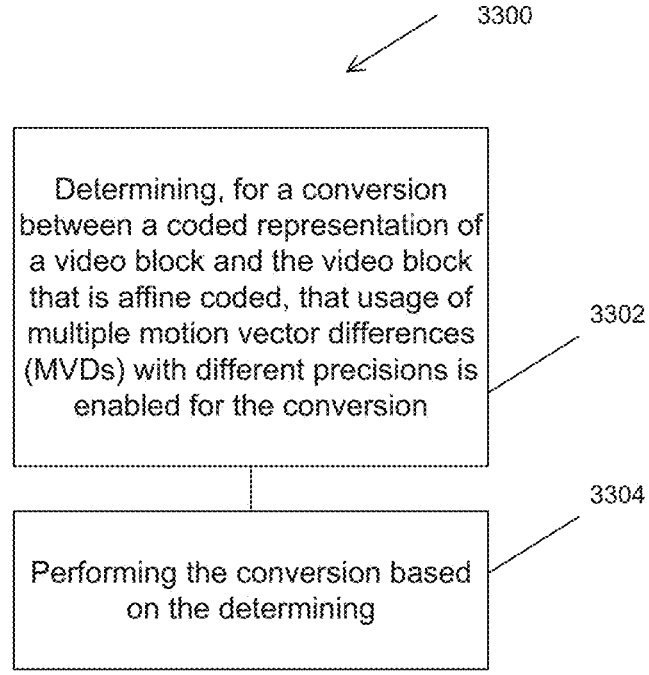
FIG. 33 is a flowchart for an example method of video processing.

FIG. 33 is a flowchart for an example method of video processing. The steps of this flowchart are generally directed at example 6 in Section 4.1 of this patent document. The method 3300 includes determining (3302), for a conversion between a coded representation of a video block and the video block that is affine coded, that usage of multiple motion vector differences (MVDs) with different precisions is enabled for the conversion. The method 3300 also includes performing (3304) the conversion based on the determining.

Figure 34:
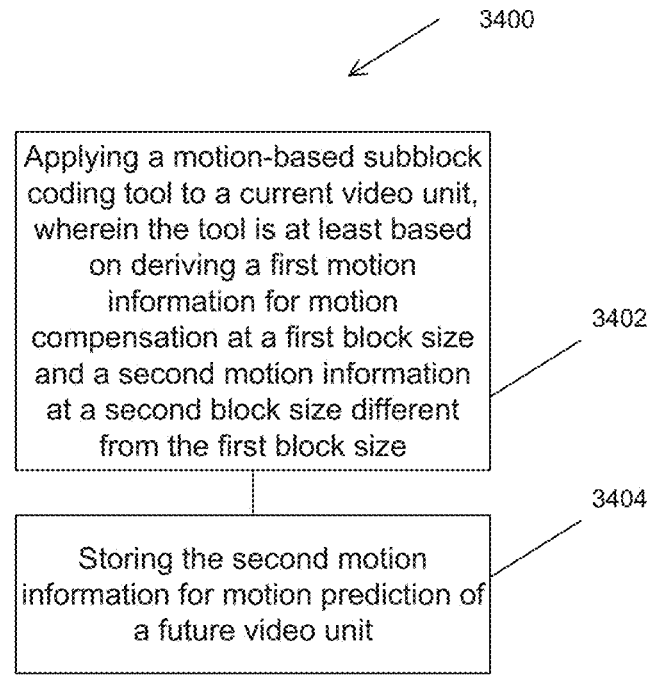
FIG. 34 is a flowchart for an example method of video processing.
Figure 35:
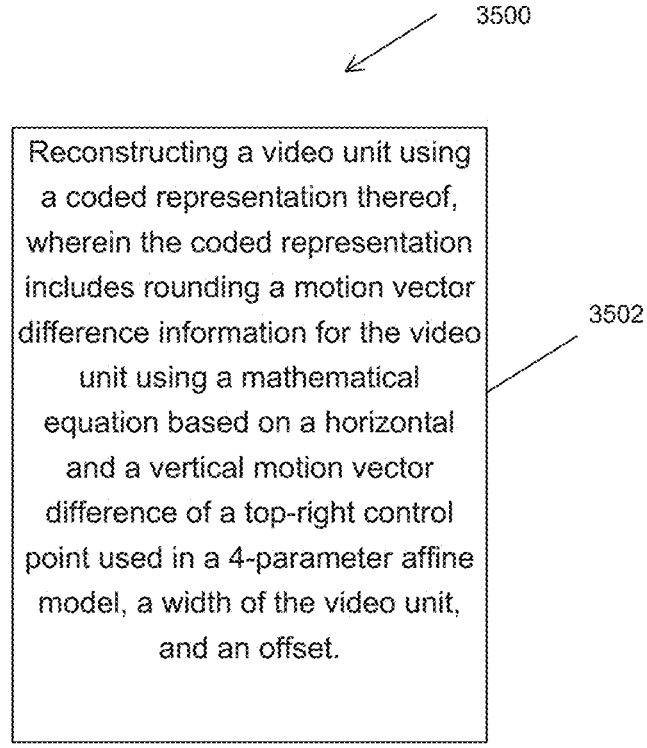
FIG. 35 is a flowchart for an example method of video processing.

FIG. 34 is a flowchart for an example method of video processing. The steps of this flowchart are generally directed at example 2 in Section 4.1 of this patent document. The method 3400 includes applying (3402) a motion-based sub-block coding tool to a current video unit, wherein the tool is at least based on deriving a first motion information for motion compensation at a first block size and a second motion information at a second block size different from the first block size. The method 3400 also includes storing (3404) the second motion information for motion prediction of a future video unit FIG. 35 is a flowchart for an example method of video processing. The steps of this flowchart are generally directed at example 3 in Section 4.1 of this patent document. The method 3500 includes reconstructing (3502) a video unit using a coded representation thereof, wherein the coded representation includes rounding a motion vector difference information for the video unit using:
$((\Sigma_{i=0}^{n-1} dMV_C^i[1]*w+o(w))\gg k(w), (-\Sigma_{i=0}^{n-1} -dMV_C^i[3]*w+o(w))\gg k(w))$, wherein $dMV_C^i[1]$, $dMV_C^i[3]$ denote a horizontal and a vertical motion vector difference of a top-right control point used in a 4-parameter affine model derived in an ith iteration, wherein >> is bit shift operation, w is a width of the video unit, k(w) is a non-negative integer, and o(w) is an offset.

Figure 36:
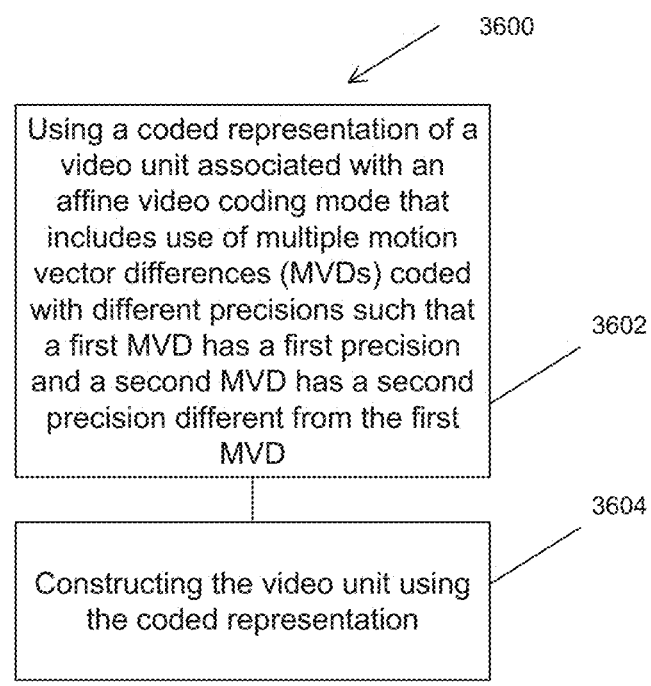
FIG. 36 is a flowchart for an example method of video processing.

FIG. 36 is a flowchart for an example method of video processing. The steps of this flowchart are generally directed at example 5 in Section 4.1 of this patent document. The method 3600 includes using (3602) a coded representation of a video unit associated with an affine video coding mode that includes use of multiple motion vector differences (MVDs) coded with different precisions such that a first MVD has a first precision and a second MVD has a second precision different from the first MVD. The method 3600 also includes constructing (3604) the video unit using the coded representation.

Some embodiments of the disclosed technology are now described in clause-based format.

1. A method of video processing, comprising:
generating, for a reconstruction of a current video unit, a list of affine motion vector prediction candidates in which each candidate in the list is calculated without using a clipping operation, wherein the clipping operation limits a magnitude of the candidate motion vectors to a limit; and
performing the reconstruction of the current video unit using the list of affine motion vector prediction candidates.

2. The method of clause 1, wherein the range is defined by a minimum value and/or a maximum value.

3. The method of clause 1, further comprising:
applying the clipping operation on the motion vectors used for performing motion compensation of the current video unit.

4. The method of clause 1, wherein the affine motion vector prediction candidates are associated with a 4-parameter or a 6-parameter affine model.

5. A video processing method, comprising:
constructing, during generation of a video unit from a coded representation thereof, a list of affine motion vector predictors using a precision that is same as a precision used for encoding motion vector differences in an affine video coding mode in the coded representation and
performing the generation of the video unit using the list of affine motion vector prediction candidates.

6. The method of clause 5, further comprising:
modifying a precision of motion vectors of a neighboring video unit, prior to use as motion vector predictors in the list of affine motion vector predictors.

7. The method of clause 6, wherein Prec represents the precision used for encoding motion vector differences in the affine video coding mode, and wherein PredPrec represents the precision of motion vector predictors of the neighboring video unit, and wherein PredPrec is modified prior to generating the list of affine motion vector predictors.

8. The method of clause 7, wherein the encoded motion vector differences have a precision expressed as 1/(2^Prec).

9. The method of clause 7, wherein motion vector predictors of the neighboring video unit have a precision expressed as 1/(2 ^PredPrec).

10. The method of clause 7, further comprising:
based on values of Prec and PredPrec, scaling the motion vectors of the neighboring video unit.

11. The method of clause 7, wherein, if PredPrec>Prec, the motion vector predictors of the neighboring video unit are denoted MVPredX, MVPredY, then modified motion vector predictors MVPred'X, MVPred'y of the neighboring video unit are calculated as:

MVPred'X=round(MVPredX,PredPrec−Prec),

MVPred'Y=round(MVPredY,PredPrec−Prec), wherein round(a, b) is defined as (a+offset)>>b, where >> is bit shift operation and offset is an integer.

12. The method of clause 11, wherein the offset is equal to (1<<(b−1)).

13. The method of clause 7, wherein, if PredPrec>Prec, the motion vector predictors of the neighboring video unit are denoted MVPredX, MVPredY, then modified motion vector predictors MVPred'X,MVPred'y of the neighboring video unit are calculated as:

MVPred'X=round(MVPredX,PredPrec−Prec),

MVPred'Y=round(MVPredY,PredPrec−Prec), wherein round(MV, deltaPrec)=MV>>deltaPrec, where >> is bit shifting operation.

14. The method of clause 7, wherein, if PredPrec<Prec, the motion vector predictors of the neighboring video unit are denoted MVPredX, MVPredY, then modified motion vector predictors MVPred'X, MVPred'y of the neighboring video unit are calculated as:

MVPred'X=MVPredX<<(PredPrec−Prec),

MVPred'Y=MVPredY<<(PredPrec−Prec).

15. The method of clause 6, wherein modifying the precision includes first deriving a motion vector predictor for the video unit at full precision, and then rounding the motion vector predictor.

16. The method of clause 5, further comprising:
using, without changing a precision of motion vectors of a neighboring video unit, the motion vectors of the neighboring video unit as motion vector predictors; and
setting the precision of the motion vector differences in the affine video coding mode to a precision selectively signaled in the coded representation of the video unit.

17. A method of video processing, comprising:
determining, for a conversion between a coded representation of a video block and the video block that is affine coded, that usage of multiple motion vector differences (MVDs) with different precisions is enabled for the conversion; and
performing the conversion based on the determining.

18. The method of clause 17, wherein an indication of the usage of the different precisions of the multiple MVDs is selectively signaled in the coded representation of the video block based at least when one or more conditions are met.

19. The method of any of clauses 17-18, wherein the indication of the usage is signaled implicitly or explicitly in one or more of the following: a sequence parameter set (SPS), a sequence header, a video parameter set (VPS), a picture parameter set (PSP), a slice header, a picture header, a coding tree unit (CTU), a coding unit (CU), a group of CTU rows, or a group of CU rows.

20. The method of any of clauses 17-19, wherein the one or more conditions relate to at least one of: a size of the video block, a shape of the video block, a coding mode associated with the video block, a number of affine parameters associated with the video block, a slice type associated with the video block, or a number of temporal layers associated with the video block.

21. The method of clause 18, wherein the indication of the usage is selectively disabled when the one or more conditions fail.

22. The method of clause 21, wherein the indication of the usage is selectively disabled when a size of the video unit is less than a threshold number of samples.

23. The method of clause 22, wherein the threshold number of samples is 16.

24. A method of video processing, comprising:
applying a motion-based subblock coding tool to a current video unit, wherein the tool is at least based on deriving a first motion information for motion compensation at a first block size and a second motion information at a second block size different from the first block size; and
storing the second motion information for motion prediction of a future video unit.

25. The method of clause 24, wherein the motion-based subblock coding tool is an affine mode motion compensation.

26. The method of clause 24, wherein the motion-based subblock coding tool is an alternate temporal motion vector prediction mode (ATMVP).

27. The method of any of clauses 24 to 26, wherein the first motion information is derived at M1×N1 block size and the second motion information is derived at M2×N2 block size, wherein M1, M2, N1 and N2 are positive integers, and wherein M1 unequals M2 and N1 unequals N2.

28. The method of any of clauses 24 to 26, wherein M1 and N1 are set equal to 8, and M2 and N2 are set equal to 4.

29. The method of any of clauses 24 to 26, wherein processing the current video unit includes processing sub-blocks of the current video unit, wherein the current video unit includes a sub-block of a first type and/or a sub-block of a second type such that the sub-block of the first type is located in an innermost region of the current video unit devoid of a common boundary with the current video unit and the sub-block of the second type shares a boundary in common with the current video unit.

30. The method of clause 29, wherein the first motion information is derived at M1×N1 block size and the second motion information is derived at M2×N2 block size or M3×N3 block size respectively based on whether the processing pertains to the sub-block of the first type or the sub-block of the second type, wherein M1, M2, M3, N1, N2 and N3 are positive integers.

31. The method of clause 30, wherein the current video unit is a current video block, the sub-block of the first type is an inner sub-block of the current video block and the sub-block of the second type is a boundary sub-block of the current video block.

32. The method of clause 31, wherein M1 and N1 are set equal to 8, M2 and N2 are set equal to 8, and M3 and N3 are set equal to 4.

33. The method of any of clauses 30-32, wherein, for the deriving of the second motion information, a rectangular block shape M×N is used for the sub-block of the second type.

34. The method of clause 33, wherein, for a right boundary, a block size with M>N is used, and for a bottom boundary, a block size with M<N is used.

35. The method of clause 34, wherein the bottom boundary includes a bottom right boundary or a bottom left boundary, and wherein for a bottom right boundary, a block size with M>N is used and for a bottom left boundary, a block size with M<N is used.

36. The method of clause 34, wherein the bottom boundary includes a bottom right boundary, and wherein, for the bottom right boundary, a block size used is smaller than a block size used at the right boundary.

37. The method of clause 34, wherein the bottom boundary includes a bottom right boundary, and wherein, for the bottom right boundary, a block size used is smaller than a block size used at the bottom boundary.

38. The method of any of clauses 24 to 37, wherein the first motion information of the future video unit is derived from the second motion information of the current video unit.

39. The method of any of clauses 24 to 37, wherein the second motion information is derived from the first motion information.

40. A video processing method, comprising:
reconstructing a video unit using a coded representation thereof, wherein the coded representation includes rounding a motion vector difference information for the video unit using:
$((\Sigma_{i=0}^{n-1} dMV_C^i[1]*w+o(w))>>k(w), (-\Sigma_{i=0}^{n-1} -dMV_C^i[3]*w+o(w))>>k(w))$ wherein $dMV_C^i[1]$, $dMV_C^i[3]$ denote horizontal and vertical motion vector difference of a top-right control point used in a 4-parameter affine model derived in an ith iteration, wherein >> is bit shift operation, w is a width of the video unit, k(w) is a non-negative integer, and o(w) is an offset.

41. The method of clause 40, wherein o(w) is expressed as $o(w)=(1<<(k(w)-1))$.

42. The method of any of clauses 40 to 41, wherein k(w) a non-decreasing function of w.

43. The method of clause 40, wherein the reconstructing includes using a first value of k(w) for a first width of the video unit and a second value of k(w) for a second width of the video unit different from the first width.

44. The method of any of clauses 40-43, wherein $$k(w) = \begin{cases} 2 & \text{if } w = 128 \\ 1 & \text{if } w = 64 \\ 0 & \text{else} \end{cases}$$

is used.

45. A method of video processing; comprising:
using a coded representation of a video unit associated with an affine video coding mode that includes use of multiple motion vector differences (MVDs) coded with different precisions such that a first MVD has a first precision and a second MVD has a second precision different from the first MVD; and
constructing the video unit using the coded representation.

46. The method of clause 45, wherein a 4-parameter affine model used in the affine video coding mode, further comprising:
if the second MVD is predicted from the first MVD, then the second precision is greater than the first precision.

47. The method of clause 46, wherein the first MVD is a MVD of a top left pixel in the video unit and the second MVD is a MVD of a top right pixel in the video unit.

48. The method of clause 45, wherein a 6-parameter affine model used in the affine video coding mode, and wherein a third MVD has a third precision, further comprising:
if the second MVD and/or the third MVD is predicted from the first MVD, then the second precision and/or the third precision is greater than the first precision.

49. The method of clause 48, wherein the first MVD is a MVD of a top left pixel in the video unit, the second MVD is a MVD of a top right pixel in the video unit, and the third MVD is a MVD of a left bottom pixel in the video unit.

50. The method of any of clauses 45-49, further comprising:
selectively enabling or disabling signaling, based on one or more conditions, an indication of usage of the different precisions of the multiple MVDs in the coded representation of the video unit.

51. The method of clause 50, wherein the first precision and/or the second precision is signaled in the coded representation of the video unit.

52. The method of any of clauses 50-51, wherein the indication of usage is signaled implicitly or explicitly in one or more of the following: a sequence parameter set (SPS), a sequence header, a video parameter set (VPS), a picture parameter set (PSP), a slice header, a picture header, a coding tree unit (CTU), a coding unit (CU), a group of CTU rows, or a group of CU rows.

53. The method of any of clauses 50-52, wherein the one or more conditions relate to at least one of: a size of the video unit, a shape of the video unit, a coding mode associated with the video unit, a number of affine parameters associated with the video unit, a slice type associated with the video unit, or a number of temporal layers associated with the video unit.

54. The method of clause 50, wherein the indication of usage is selectively disabled when the one or more conditions fail.

55. The method of clause 54, wherein the indication of usage is selectively disabled when a size of the video unit is less than a threshold number of samples.

56. The method of clause 55, wherein the threshold number of samples is 16.

57. A video decoding apparatus comprising a processor configured to implement a method recited in one or more of clauses 1 to 56.

58. A video encoding apparatus comprising a processor configured to implement a method recited in one or more of elaimsclauses 1 to 56.

59. A computer program product having computer code stored thereon, the code, when executed by a processor, causes the processor to implement a method recited in any of clauses 1 to 56.

60. A method, apparatus, or system described in the present document.

With reference to the above solutions, in some embodiments, a video unit is a video block that includes one or more components (e.g., luma and/or chroma) In some embodiments, a video unit corresponds to a coding unit (CU). In some embodiments, a video unit may be a prediction unit (PU) or a transform unit (TU).

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention(s) or of what may be claimed, but rather as descriptions of features that may be specific to particular embodiments of particular invention(s). Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   constructing, during performing a conversion between a video unit in an affine video coding mode and a bitstream thereof, a list of control point motion vector predictors using a precision that is same as a precision used for a signaled control point motion vector difference of the video unit; wherein a precision of a motion vector related to a neighboring video unit is modified to the precision used for the signaled control point motion vector difference, prior to being used as a motion vector predictor in the list of control point motion vector predictors; and
   performing the conversion using the list of control point motion vector predictors,
   wherein the precision used for the signaled motion vector difference is expressed as $1/(2^\text{Prec})$, and the precision of the motion vector related to the neighboring video unit is expressed as $1/(2^\text{Prec})$.

2. The method of claim 1, wherein the precision of the motion vector related to the neighboring video unit is modified by modifying the PredPrec.

3. The method of claim 1, wherein modifying the precision of the motion vector related to the neighboring video unit comprises:
   scaling the motion vector related to the neighboring video unit based on at least one of Prec and PredPrec.

4. The method of claim 3, wherein the motion vector related to the neighboring video unit is scaled based on the difference between the Prec and PredPrec.

5. The method of claim 1, wherein, if PredPrec>Prec, the motion vectors related to the neighboring video unit are denoted $\text{MVPred}_X$, $\text{MVPred}_Y$, then the motion vector predictors $\text{MVPred}'_X$, $\text{MVPred}'_Y$ of the list of control point motion vector predictors are calculated as:

$$\text{MVPred}'_X = \text{round}(\text{MVPred}_X, \text{PredPrec}-\text{Prec}),$$

$$\text{MVPred}'_Y = \text{round}(\text{MVPred}_Y, \text{PredPrec}-\text{Prec}),$$

wherein round(a, b) is defined as (a+offset)>>b, where >> is bit shift operation and offset is an integer.

6. The method of claim 5, wherein the offset is equal to $(1<<(b-1))$.

7. The method of claim 1, wherein, if PredPrec>Prec, the motion vectors related to the neighboring video unit are denoted $\text{MVPred}_X$, $\text{MVPred}_Y$, then the motion vector predictors $\text{MVPred}'_X$, $\text{MVPred}'_Y$ of the list of control point motion vector predictors are calculated as:

$$\text{MVPred}'_X = \text{round}(\text{MVPred}_X, \text{PredPrec}-\text{Prec}),$$

$$\text{MVPred}'_Y = \text{round}(\text{MVPred}_Y, \text{PredPrec}-\text{Prec}),$$

wherein round(MV,deltaPrec)=MV>>deltaPrec, where >> is bit shifting operation.

8. The method of claim 1, wherein, if PredPrec<Prec, the motion vectors related to the neighboring video unit are denoted $\text{MVPred}_X$, $\text{MVPred}_Y$, then the motion vector predictors $\text{MVPred}'_X$, $\text{MVPred}'_Y$ of the list of control point motion vector predictors are calculated as:

$$\text{MVPred}'_X = \text{MVPred}_X <<(\text{PredPrec}-\text{Prec}),$$

$$\text{MVPred}'_Y = \text{MVPred}_Y <<(\text{PredPrec}-\text{Prec}).$$

9. The method of claim 1, wherein indication of usage of different precisions of multiple control point motion vector differences of the video unit is selectively signaled in the bitstream of the video unit based at least when one or more conditions are met.

10. The method of claim 1, wherein the indication of the usage is signaled implicitly or explicitly in one or more of the following: a sequence parameter set (SPS), a sequence header, a video parameter set (VPS), a picture parameter set (PSP), a slice header, a picture header, a coding tree unit (CTU), a coding unit (CU), a group of CTU rows, or a group of CU rows.

11. The method of claim 1, wherein the one or more conditions relate to at least one of: a size of the video unit, a shape of the video unit, a coding mode associated with the video unit, a number of affine parameters associated with the video unit, a slice type associated with the video unit, or a number of temporal layers associated with the video unit.

12. The method of claim 1, wherein the conversion comprises: encoding the video unit into the bitstream.

13. The method of claim 1, wherein the conversion comprises: decoding the video unit from the bitstream.

14. An apparatus for processing video data comprising a processor and a non-transitory memory with instructions thereon, wherein the instructions upon execution by the processor, cause the processor to:
   construct, during performing a conversion between a video unit in an affine video coding mode and a bitstream thereof, a list of control point motion vector predictors using a precision that is same as a precision used for a signaled control point motion vector difference of the video unit; wherein a precision of a motion vector related to a neighboring video unit is modified to the precision used for the signaled control point motion vector difference, prior to being used as a motion vector predictor in the list of control point motion vector predictors; and
   perform the conversion using the list of control point motion vector predictors,
   wherein the precision used for the signaled motion vector difference is expressed as $1/(2^\text{Prec})$, and the precision of the motion vector related to the neighboring video unit is expressed as $1/(2^\text{Prec})$.

15. The apparatus of claim 14, wherein the conversion comprises: encoding the video unit into the bitstream.

16. The apparatus of claim 14, wherein the conversion comprises: decoding the video unit from the bitstream.

17. A non-transitory computer-readable storage medium storing instructions that cause a processor to:

construct, during performing a conversion between a video unit in an affine video coding mode and a bitstream thereof, a list of control point motion vector predictors using a precision that is same as a precision used for a signaled control point motion vector difference of the video unit; wherein a precision of a motion vector related to a neighboring video unit is modified to the precision used for the signaled control point motion vector difference, prior to being used as a motion vector predictor in the list of control point motion vector predictors; and perform the conversion using the list of control point motion vector predictors, wherein the precision used for the signaled motion vector difference is expressed as $1/(2^{\wedge}\text{Prec})$, and the precision of the motion vector related to the neighboring video unit is expressed as $1/(2^{\wedge}\text{Prec})$.

18. A non-transitory computer-readable recording medium storing a bitstream which is generated by a method performed by a video processing apparatus, wherein the method comprises:

constructing, for a video unit in an affine video coding mode, a list of control point motion vector predictors using a precision that is same as a precision used for the signaled control point motion vector difference of the video unit; wherein a precision of a motion vector related to a neighboring video unit is modified to the precision used for the signaled control point motion vector difference, prior to being used as a motion vector predictor in the list of control point motion vector predictors; and generating the bitstream from the video unit using the list of control point motion vector predictors, wherein the precision used for the signaled motion vector difference is expressed as $1/(2^{\wedge}\text{Prec})$, and the precision of the motion vector related to the neighboring video unit is expressed as $1/(2^{\wedge}\text{Prec})$.

\* \* \* \* \*